United States Patent
McAndrew et al.

(10) Patent No.: US 10,401,721 B2
(45) Date of Patent: Sep. 3, 2019

(54) NON-STRAIGHT SEAMING

(71) Applicant: PRYSM, Inc., San Jose, CA (US)

(72) Inventors: David M. McAndrew, Melrose, MA (US); John L. Ritter, Harvard, MA (US)

(73) Assignee: PRYSM, INC., San Jose, CA (US)

( * ) Notice: Subject to any disclaimer, the term of this patent is extended or adjusted under 35 U.S.C. 154(b) by 0 days.

(21) Appl. No.: 15/126,406

(22) PCT Filed: Feb. 19, 2015

(86) PCT No.: PCT/US2015/016558
§ 371 (c)(1),
(2) Date: Sep. 15, 2016

(87) PCT Pub. No.: WO2015/127035
PCT Pub. Date: Aug. 27, 2015

(65) Prior Publication Data
US 2017/0075206 A1  Mar. 16, 2017

Related U.S. Application Data

(60) Provisional application No. 61/942,828, filed on Feb. 21, 2014.

(51) Int. Cl.
*G09G 5/00* (2006.01)
*G03B 21/62* (2014.01)
(Continued)

(52) U.S. Cl.
CPC ........... *G03B 21/62* (2013.01); *G03B 21/567* (2013.01); *G09F 9/3026* (2013.01); *G09G 3/02* (2013.01);
(Continued)

(58) Field of Classification Search
CPC ......... G02F 1/133308; G02F 1/133608; G02F 2202/28
See application file for complete search history.

(56) References Cited

U.S. PATENT DOCUMENTS

| 5,903,328 A * | 5/1999 | Greene ............... G02F 1/13336 156/304.1 |
| 6,881,946 B2 | 4/2005 | Cok et al. |

(Continued)

OTHER PUBLICATIONS

PCT Notification of Transmittal of the International Search Report and the Written Opinion of the International Searching Authority for International Application No. PCT/US2015/016558; dated May 20, 2015; 9 total pages.

*Primary Examiner* — Nan-Ying Yang
(74) *Attorney, Agent, or Firm* — Patterson & Sheridan, LLP; Steven Versteeg

(57) ABSTRACT

Implementations described herein generally relate to the use of display screens. More specifically, implementations generally relate to a large format transmissive and self-emissive display screen where the display screen includes multiple screens coupled together using transparent adhesive tape. Implementations described herein minimize internal reflections visible to screen viewers when an edge of the adhesive layer is scanned by a beam spot produced by a scanning beam in a scanning beam system having multiple screens held together by the adhesive layer to form a seamless viewing screen. In some implementations, the internal reflections are minimized by applying the adhesive layer between horizontal and vertical seams between each screen of the multiple screens wherein the adhesive layer has non-straight edges so as to minimize the total surface area of the edge of the adhesive layer that falls within the beam spot produced by the scanning beam.

15 Claims, 15 Drawing Sheets

(51) Int. Cl.
  *G09F 9/302*   (2006.01)
  *G03B 21/56*   (2006.01)
  *G09G 3/02*    (2006.01)
  G02F 1/1333    (2006.01)
  H04N 5/70      (2006.01)
  H04N 5/64      (2006.01)

(52) U.S. Cl.
  CPC ... *G02F 1/13336* (2013.01); *G09G 2300/026* (2013.01); *H04N 5/64* (2013.01); *H04N 5/70* (2013.01)

(56) References Cited

U.S. PATENT DOCUMENTS

| | | |
|---|---|---|
| 2011/0215990 A1 | 9/2011 | Liesenberg |
| 2011/0305000 A1* | 12/2011 | Bukesov ............... G02B 5/201 |
| | | 362/84 |
| 2013/0176623 A1 | 7/2013 | Hajjar et al. |

* cited by examiner

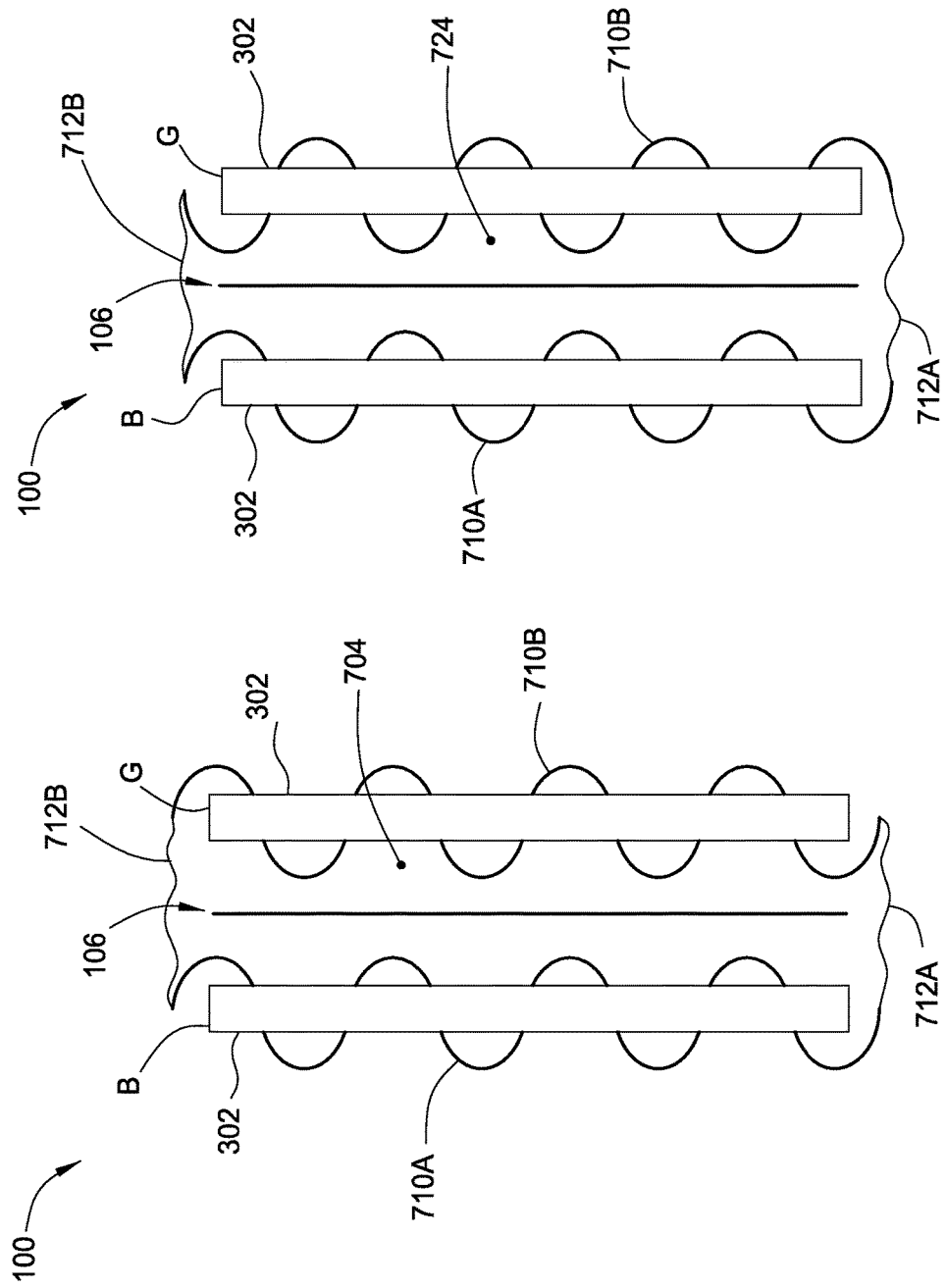

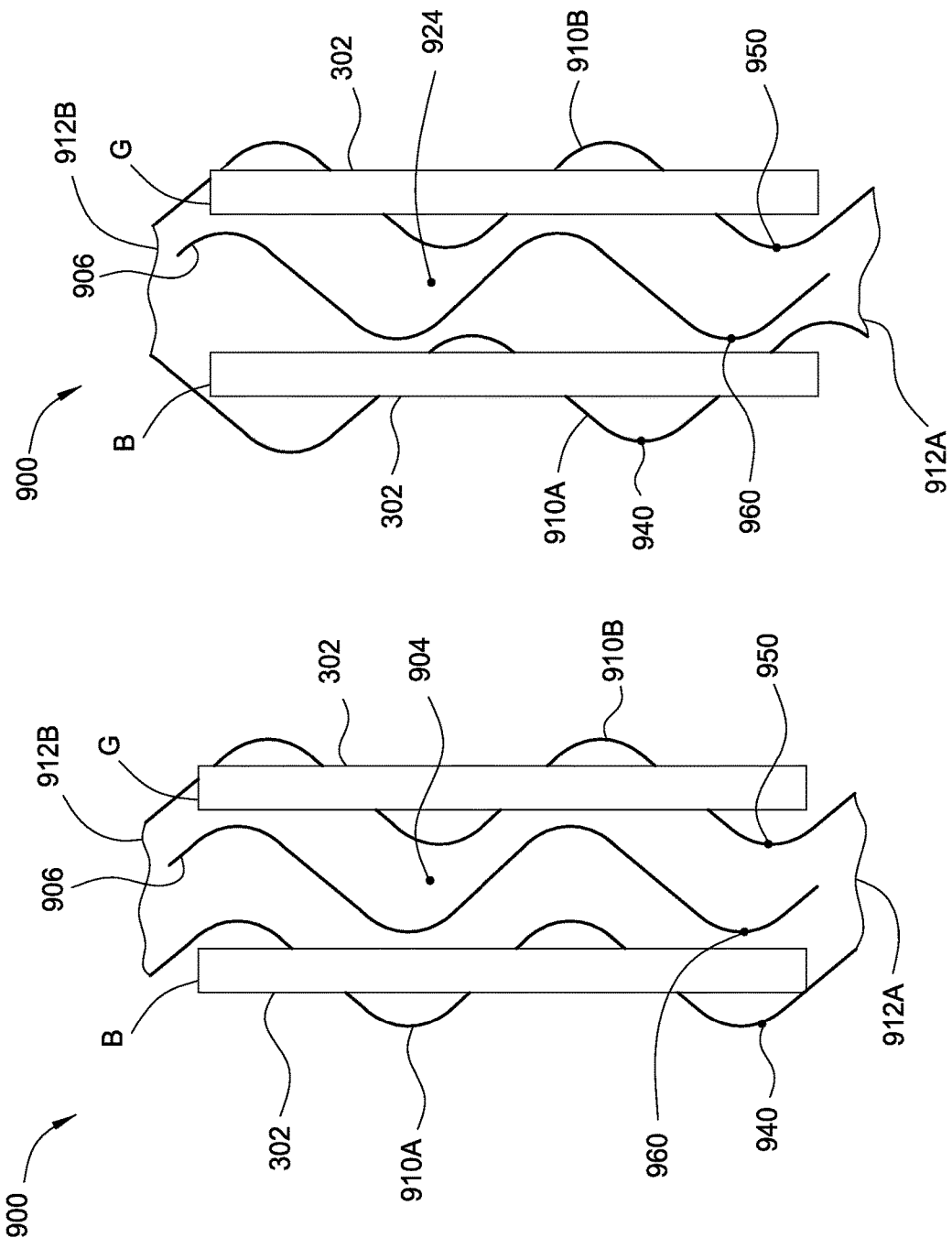

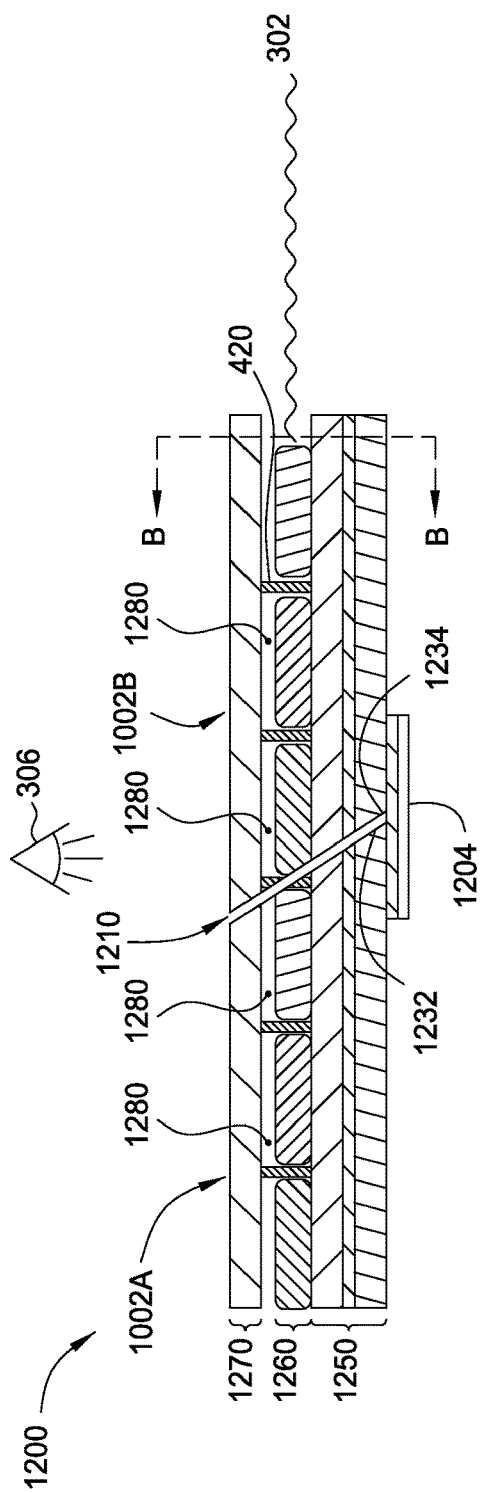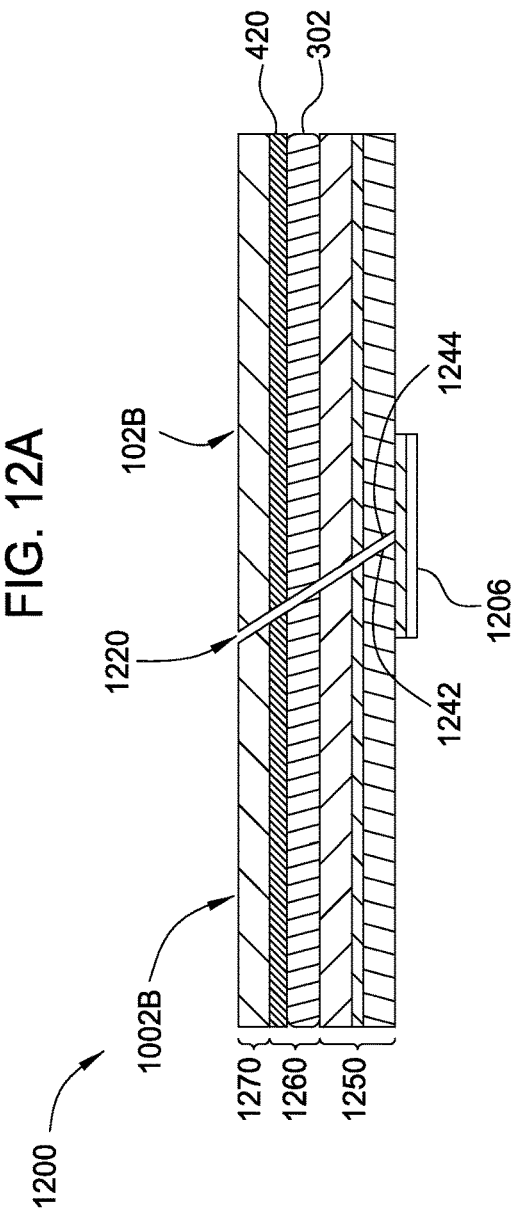

NON-STRAIGHT SEAMING

BACKGROUND

Field

Implementations described herein generally relate to the use of display screens. More specifically, implementations generally relate to a large format transmissive and self-emissive display screens where the display screen includes multiple screens coupled together.

Description of the Related Art

Electronic display systems, including stereo display systems, are commonly used to display information from computers and other sources. Typical display systems range in size from small displays used in mobile devices to very large displays, such as tiled displays, that are used to display large size images and video. Examples of such displays include rear projection displays such as digital light processing (DLP) displays, liquid crystal on silicon (LCoS) displays, grating light valve (GLV) displays and laser-phosphor displays (LPD). Tiled display systems are generally made up of multiple smaller individual display devices, or "tiles", that are carefully aligned when assembled to provide a seamless and uniform appearance. In some implementations, each tile may be a light-based electronic display device, such an LPD, including a self-contained laser-based image-generating system.

The LPD screen is typically a set of distinct passive material layers. Each layer serves a different contributing purpose to the making of a laser phosphor display screen. If the desired screen size is a fixed size larger than an individual LPD screen, the fixed size requires the abutting or tiling of these fixed sized screens together. This results in a discernible line at the seam between the distinct tiled screens. One possible technique involves taping which involves an adhesive holding two abutted layers together. The problem with taping for translucent or transparent layers is that as light shines through, the adhesive layer and its edges are visible to the viewer in the form of discoloration and brightness change without considerations to impinging and emitted light.

Epoxies or adhesives are also used to hold abutted seams together by laminating multiple films on one large transmissive surface. However, this process does not lend itself to accurate and uniform placement of the screen tiles due to epoxy non-uniformity or shifts during lamination for very large surfaces. Additionally, epoxies and adhesives on a large plane tend to have imperfections that, when the light shines through, will reveal discontinuities.

Accordingly, there is a need in the art for systems and methods of tiling multi-layer transmissive screens without the noticed seam.

SUMMARY

Implementations described herein generally relate to the use of display screens. More specifically, implementations generally relate to a large format transmissive and self-emissive display screen where the display screen includes multiple screens coupled together. In one implementation, a display screen for displaying an image is provided. The display screen comprises a plurality of adjacent sheets with seams formed therebetween and a transparent adhesive layer that runs along at least one seam coupling the adjacent sheets to form the display screen. The transparent adhesive layer comprises a pair of opposing major edges, wherein at least one major edge of the transparent adhesive layer forms an oblique angle relative to a nearest distance of the at least one major edge to the seam so as not to be parallel to the seam, wherein the at least one major edge may overlap with a light emanating imaging portion of the display screen. The image is perceived on a display screen side opposite a light generator. The display screen is configured to propagate light corresponding to segments of light formed by the light generator contributing to forming the image.

According to one implementation, the at least one major edge of the transparent adhesive layer is defined by a sine waveform pattern or a non-sinusoidal waveform pattern.

According to another implementation, the non-sinusoidal waveform pattern is selected from the group consisting of: triangle waveform patterns, saw tooth waveform patterns and square waveform patterns.

According to yet another implementation, the at least one major edge of the transparent adhesive layer is defined by a sine wave form pattern and the at least one seam is defined by a sine wave pattern.

According to yet another implementation, the display screen further comprises one or more phosphor stripes configured to receive light from the light generator and produce one or more wavelengths of light in response to the light received and one or more separator segments positioned between and in parallel with the phosphor stripes, the separator segments configured to separate the one or more phosphor stripes from one another.

According to yet another implementation, the at least one seam forms an oblique angle relative to its nearest distance to at least one of the one or more phosphor stripes.

According to yet another implementation, the at least one major edge of the transparent adhesive layer overlaps at least a portion of the one or more phosphor stripes.

According to yet another implementation, the at least one major edge of the transparent adhesive layer overlaps at least one pixel location on at least one of the adjacent sheets.

According to yet another implementation, the at least one major edge of the transparent adhesive layer overlaps the one or more separator segments positioned between and in parallel with the one or more phosphor stripes.

According to yet another implementation, the transparent adhesive layer is transparent tape.

According to yet another implementation, wherein the light generator generates a scanning beam.

In another implementation, a system is provided. The system comprises a light generator configured to produce segments of light contributing to forming an image and a display screen. The image is perceived on the display screen side opposite the light generator. The display screen propagates light corresponding to the segments of light contributing to forming an image. The display screen comprises a plurality of adjacent sheets with seams formed therebetween, wherein the plurality of sheets are coupled together to form the display screen and a transparent adhesive layer that runs along at least one seam coupling the adjacent sheets. The transparent adhesive layer comprises a pair of opposing major edges, wherein at least one major edge of the transparent adhesive layer forms an oblique angle relative to a nearest distance of the at least one major edge to the seam so as not to be parallel to the seam, wherein the at least one major edge may overlap with a light emanating imaging portion of the display screen.

According to one implementation, the at least one major edge of the transparent adhesive layer is defined by a sine waveform pattern or a non-sinusoidal waveform pattern.

According to another implementation, the non-sinusoidal waveform pattern is selected from the group consisting of:

triangle waveform patterns, saw tooth waveform patterns and square waveform patterns.

According to yet another implementation, the at least one major edge of the transparent adhesive layer is defined by a sine wave form pattern and the at least one seam is defined by a sine wave pattern.

According to yet another implementation, the at least one seam forms an oblique angle relative to its nearest distance to at least one of the one or more phosphor stripes positioned on the display screen.

According to yet another implementation, the segment of light has at least a major axis and any two points of intersection of a perimeter of the segment of light with the at least one major edge forms a line segment which is less than the length of the major axis.

According to yet another implementation, the segment of light has an aspect ratio of greater than one.

According to yet another implementation, the size of the segment of light corresponds to a pixel.

According to yet another implementation, the size of the segment of light corresponds to a sub-pixel.

According to yet another implementation, the display screen further comprises one or more phosphor stripes configured to receive light from the light generator and produce one or more wavelengths of light in response to the light received and one or more separator segments positioned between and in parallel with the phosphor stripes, the separator segments configured to separate the one or more phosphors stripes from one another.

According to yet another implementation, the at least one major edge of the transparent adhesive layer overlaps the one or more phosphor stripes.

According to yet another implementation, the at least one major edge of the transparent adhesive layer overlaps at least one pixel location on at least one of the adjacent sheets.

According to yet another implementation, wherein the at least one major edge of the transparent adhesive layer overlaps the one or more separator segments positioned between and in parallel with the one or more phosphor stripes.

According to yet another implementation, the transparent adhesive layer is transparent tape.

According to yet another implementation, the transparent adhesive layer is a layer of a multi-layer display screen.

In yet another implementation, a method for displaying images on a screen is provided. The method comprises providing a display screen for displaying the image, producing an optical beam of light to carry image data for an image to be displayed on the screen and directing the optical beam of light onto the screen to produce a segment of light on the screen. The display screen comprises a plurality of adjacent sheets with seams formed therebetween, wherein the plurality of sheets are coupled together to form the display screen and a transparent adhesive layer that runs along at least one seam coupling the adjacent sheets. The transparent adhesive layer comprises a pair of opposing major edges, wherein at least one major edge of the transparent adhesive layer forms an oblique angle relative to a nearest distance of the at least one major edge to the seam so as not to be parallel to the seam, wherein the at least one major edge may overlap with a light emanating imaging portion of the display screen. The segment of light has at least a major axis and any two points of intersection of a perimeter of the segment of light with the at least one major edge forms a line segment which is less than the length of the major axis.

According to one implementation, the segment of light has an aspect ratio of greater than one.

According to another implementation, the size of the segment of light corresponds to a pixel.

According to yet another implementation, the size of the segment of light corresponds to a sub-pixel.

According to yet another implementation, the display screen further comprises one or more phosphor stripes configured to receive light from the light generator and produce one or more wavelengths of light in response to the light received and one or more separator segments positioned between and in parallel with the phosphor stripes, the separator segments configured to separate the phosphor stripes from one another.

According to yet another implementation, the at least one major edge of the transparent adhesive layer is defined by a sine waveform pattern or a non-sinusoidal waveform pattern.

According to yet another implementation, the non-sinusoidal waveform pattern is selected from the group consisting of: triangle waveform patterns, saw tooth waveform patterns and square waveform patterns.

According to yet another implementation, the at least one major edge of the transparent adhesive layer is triangular having a linearly upward edge portion that ramps up to form a peak with a linearly downward edge portion and the linearly downward edge portion ramps downward to form a trough with an adjacent linearly upward edge portion.

According to yet another implementation, an angle "$\alpha$" formed between the linearly upward edge portion and the linearly downward edge portion is from about 20 degrees to about 50 degrees.

In yet another implementation, a method for manufacturing a display screen for displaying an image is provided. The method comprises coupling adjacent sheets together by applying a transparent adhesive layer along at least one seam formed between the adjacent sheets. The transparent adhesive layer comprises a pair of opposing major edges, wherein at least one major edge of the transparent adhesive layer forms an oblique angle relative to its nearest distance to the seam so as not to be parallel to the seam, wherein the at least one major edge may overlap with a light emanating imaging portion of the display screen.

Certain implementations described herein generally relate to presentation of images, both as a standard image and as a stereo image, from a plurality of tiled displays. In one implementation, a system can include a light generator configured to produce light; and a multi-layer screen with a plurality of layers, the multi-layer screen configured to permit the light from the light generator to propagate therethrough. The plurality of layers can include a non-emission region layer having a plurality of non-emission regions and a first layer comprising one or more abutted layers on a common plane, the abutted layers spaced apart by a gap, wherein the gap is coincident with the non-emission region.

In another implementation, a system can include a light generator configured to produce and direct light and a plurality of multi-layer screens. The system comprises a light generator, a multi-layer screen which permits light from the light generator to propagate through at least one or more layers of the multi-layer screen where at least one layer is a non-emission region layer, comprising at least a first one dimensional non-emission region with a width, and a first layer within the multi-layer screen, where the first layer is two films abutted against each other, the abutment includes a first film layer gap between the two films, wherein the first film layer gap between the two films is coincident with the first non-emission region.

In another implementation a system is provided. The system comprises a light generator, a multi-layer screen which permits light from the light generator to propagate through at least one or more layers of the multi-layer screen where at least one layer is scanned by a nearly fixed aperture sized beam of light along a first scan line, and a first layer within the multi-layer screen, where the first layer is two films abutted against each other, the abutment includes a first film layer gap between the two films where the first film layer gap between the two films is parallel with the scan line.

Each multi-layer screen can include a servo layer having a first edge and configured to provide feedback, a second layer with a second edge and a filter layer having a third edge and configured to filter a wavelength of light received from at least the light generator, wherein at least one of the first edge, the second edge and the third edge extends beyond one of the remaining edges. The plurality of multi-layer screens can be configured to connect between the first edge, the second edge and the third edge of the corresponding screen to create a first gap, a second gap and a third gap respectively, wherein at least one of the first gap, the second gap and the third gap are positioned such that light which passes through the respective gap is directed to the standoffs.

In another implementation, a system can include a light generator configured to produce light at a first wavelength and a plurality of multi-layer screens, each multi-layer screen including a filter layer having a first edge, a second layer having a second edge, and a servo layer having a third edge and positioned in connection with the second side of the phosphor layer and configured to provide feedback to the light engine control system, wherein at least two of the first edge, the second edge and the third edge are not coincident, and wherein at least one of the first edge, the second edge and the third edge are formed coincident with one of the plurality of standoff dividers. The second layer can include a first side, a second side positioned opposite the first side and a plurality of light propagation regions positioned in connection with the first side.

In another implementation, a system can include a light generator configured to produce light and a multi-layer screen with a plurality of layers, the multi-layer screen configured to permit the light from the light generator to propagate therethrough. The plurality of layers can include a first light propagation layer having a plurality of first light propagation regions and a plurality of second light propagation regions and a second layer comprising one or more abutted layers disposed within a common plane, wherein the abutted edges of each of the abutted layers spaced apart by a first gap, wherein the first gap is coincident with a first layer first light propagation region.

In another implementation, a system can include a light generator configured to produce and direct light and a plurality of multi-layer screens. Each multi-layer screen can include a servo layer configured to provide feedback and having a first edge, a second layer configured to deliver visible light to a viewer, configured to have two or more non-emission light propagation regions and having a second edge, a filter layer configured to filter a wavelength of light received from at least the light generator and having a third edge, wherein the first edge and the second edge are not coinciding with the third edge and the plurality of multi-layer screens being configured to connect between at least the first edge, the second edge and the third edge of the corresponding screen to create a first gap, a second gap and a third gap respectively, wherein at least one of the first gap, the second gap and the third gap are configured adjacent to one or more non-emission light propagation regions.

In another implementation, a system can include a light generator configured to produce a scanning light and a multi-layer screen with a plurality of layers, the multi-layer screen configured to permit the light from the light generator to propagate therethrough. The plurality of layers can include a first light propagation layer having a plurality of first light propagation regions and a plurality of second light propagation regions. and a second layer comprising two or more abutted layers disposed within a common plane comprising a first layer comprising a first abutted edge and a second layer comprising a second abutted edge, the first abutted edge and the second abutted edge having a common plane and spaced apart by a first gap, wherein the first gap is coincident with the first light propagation region of the first light propagation layer; and the second layer comprising a third abutted edge and a third layer comprising a fourth abutted edge, the third abutted edge and the fourth abutted edge having a common plane and spaced apart by a second gap, wherein the second gap is coincident with a scan line, and wherein at least one layer is scanned by a nearly fixed aperture sized beam of light along the scan line.

In another implementation, a system can include a light generator configured to produce light, a multi-layer screen configured to permit light from the light generator to propagate through at least one or more layers of the multi-layer screen where at least one layer is scanned by a nearly fixed aperture sized beam of light along a first scan line and a first layer plane within the multi-layer screen, the first layer plane comprising two layers, wherein the edge of each of two layers within the plane abut against each other creating a first layer plane gap between the two layers, and wherein the first layer plane gap between the two films is coincident with the first scan line. In a further implementation, the light generator can be further configured to render image information in producing the scan line in line with the second gap. In a further implementation, the light generator is further configured to render image information in producing the scan line not in line with the second gap.

BRIEF DESCRIPTION OF THE DRAWINGS

So that the manner in which the above recited features of the present disclosure can be understood in detail, a more particular description of the disclosure, briefly summarized above, may be had by reference to implementations, some of which are illustrated in the appended drawings. It is to be noted, however, that the appended drawings illustrate only typical implementations of this disclosure and are therefore not to be considered limiting of its scope, for the disclosure may admit to other equally effective implementations.

FIGS. 7A-7C are schematic diagrams of other implementations of an adhesive layer coupling two adjacent screens together to produce a large seamless screen according to implementations described herein;

FIGS. 9A-9C are schematic diagrams of other implementations of an adhesive layer coupling two adjacent screens together to produce a large seamless screen according to implementations described herein;

FIG. 12A is a schematic diagram of another implementation of the display screen of FIG. 2 having a seamless panel joint formed between two adjacent screens;

FIG. 12B is a partial cross-sectional schematic view of a display screen taken along section B-B of FIG. 12A.

For clarity, identical reference numbers have been used, where applicable, to designate identical elements that are common between figures. It is contemplated that features of one implementation may be incorporated in other implementations without further recitation.

DETAILED DESCRIPTION

Figure 1:
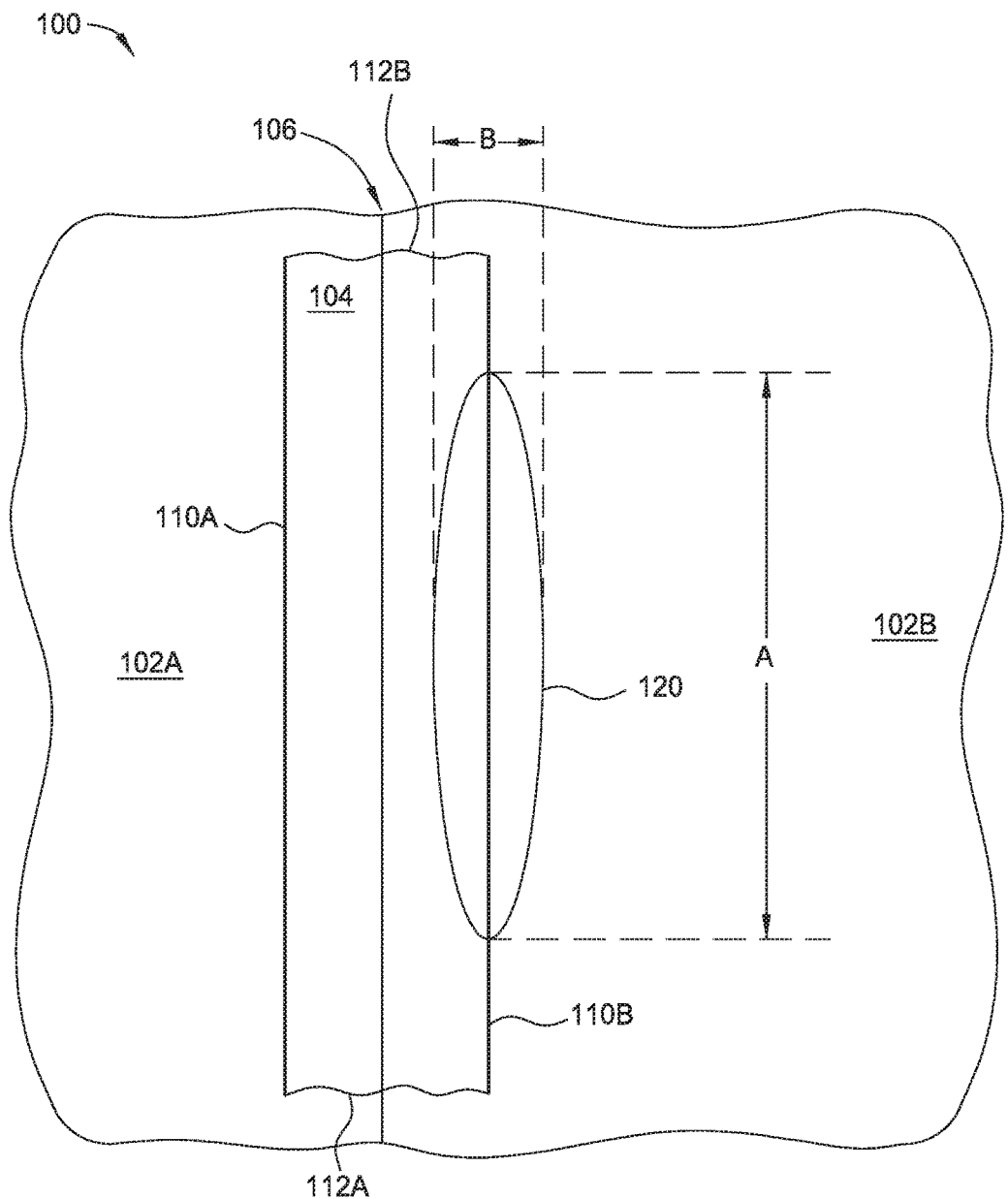
FIG. 1 is a schematic diagram of a portion of a display system using prior art adhesive layer to couple two adjacent screens together to produce a large display screen.

The following disclosure generally relates to a large format transmissive and self-emissive display screens where the display screen includes multiple screens coupled together. Certain details are set forth in the following description and in FIGS. 1 to 13 to provide a thorough understanding of various implementations of the disclosure. Other details describing well-known methods and systems often associated with production of epoxides are not set forth in the following disclosure to avoid unnecessarily obscuring the description of the various implementations.

Many of the details, dimensions, angles and other features shown in the figures are merely illustrative of particular implementations. Accordingly, other implementations can have other details, components, dimensions, angles and features without departing from the spirit or scope of the present disclosure. In addition, further implementations of the disclosure can be practiced without several of the details described below.

As used herein, the following terms have the meaning set forth below unless otherwise stated or clear from the context of their use.

When introducing elements of the present disclosure or exemplary aspects or implementation(s) thereof, the articles "a," "an," "the" and "said" are intended to mean that there are one or more of the elements.

The terms "comprising," "including" and "having" are intended to be inclusive and mean that there may be additional elements other than the listed elements.

The terms "gap" and "seam" are used interchangeably and are intended to include any opening formed between two or more abutting edges between two sheets or sheet layers. In one implementation, the positioning between two edges can form a gap or seam.

The phrase "layer adjacent" is a descriptive term used to denote an adjacency between the surface planes of two layers, such as between a first layer plane and a second layer plane of a multi-layer screen. In one example, two rectangular layers, each having two surfaces and four edges, are layer adjacent when positioned with one surface of the first layer is in contact with one surface of the second layer. Layer adjacent can also correspond to portions of a layer, such as when a portion of the surface of a first layer being layer adjacent to a portion of a surface of a second layer.

Implementations described herein generally relate to the use of display screens. The implementations described herein generally relate to rear projection display systems. Examples of rear projection display systems include but are not limited to DLP displays, LCoS displays, GLV displays and LPDs. More specifically, implementations generally relate to a large format transmissive and self-emissive display screen where the display screen includes multiple screens coupled together using a transparent adhesive layer. Transparent adhesive layer generally refers to any adhesive fastener that is operable to couple screen panels together or to couple screen panels to a frame. Exemplary transparent adhesive layers may include tape and adhesive layers. The transparent adhesive layer may have adhesive on one side or both sides of a transparent sheet.

Implementations described herein minimize internal reflections visible to screen viewers when an edge of the transparent adhesive layer is scanned by a beam spot. The beam spot is typically produced by a scanning beam in a scanning beam system having multiple screens held together by the transparent adhesive layer to form, as seen by the viewer, when imaged by the scanning beam, a seamless viewing screen. In some implementations, the internal reflections are minimized by applying the transparent adhesive layer over seams (e.g., horizontal and vertical seams) formed between each screen of the multiple screens. The transparent adhesive layer has non-straight edges so as to minimize the total surface area of the edge of the tape that falls within the beam spot produced by the scanning beam. In some implementations, at least a portion of the edges of the transparent adhesive layer are designed such that the edges of the transparent adhesive layer are not perpendicular to a swath of the beam spot. In some implementations, the at least one edge of the transparent adhesive layer is oblique relative to the seam between each screen and/or a centerline of the transparent adhesive layer. In some implementations, at least one major edge of the transparent adhesive layer forms an oblique angle relative to a nearest distance of the at least one major edge to the seam so as not to be parallel to the seam. In some implementations, any two points of intersection of the perimeter of the beam spot with the major edge of the transparent adhesive layer forms a line segment which is less than the length of a major axis of the beam spot.

FIG. 1 is a schematic diagram of a portion of a display system 100 using prior art transparent adhesive layer 104 to couple two adjacent display screens 102A, 102B together to produce a large display screen. The transparent adhesive layer 104 is transparent. Additional aspects of the display screens 102A, 102B will be further described in FIGS. 3, 4 and 5A-5C. A "gap" or seam 106 is typically formed between the abutting edges of the display screens 102A, 102B. The seam 106 may be a straight seam or other shaped seam (e.g., a non-straight seam or angled seam) depending upon the design of the abutting edges of the display screens 102A, 102B. As used herein a "straight seam" refers to a seam that is in line with the parallel nature of the phosphor stripes, where the term "non-straight seam" may include seams that have an angle, a curve a sawtooth, etc. from the line of a phosphor stripe. The seam may form an oblique angle relative to its nearest distance to at least one of the one or more phosphor stripes positioned on the display screen. The large display screen formed by coupling several display screens together, for example, coupling the display screens 102A, 102B together, typically appears to be seamless meaning that the perceptual view by the viewer is without noticeable seams.

The transparent adhesive layer 104 has two parallel major edges 110A, 110B which are positioned parallel to the seam 106 and two parallel minor edges 112A, 112B which are positioned perpendicular to the seam 106. The side of the transparent adhesive layer 104 contacting the display screens 102A, 102B has an adhesive fastener disposed thereon and operable to couple the two display screens 102A, 102B together. The adhesive fastener may be an acrylic adhesive selected to optimally adhere to the respective surfaces of each display screen 102A, 102B.

A beam spot 120 or "segment of light", formed by a scanning light generator 305 (see FIG. 3), is depicted on the display screen 102B as it crosses the major edge 110B of the transparent adhesive layer 104. The beam spot 120 has an oval shape with a major axis and a minor axis. The length of the major axis is represented by "A" and the length of the minor axis is represented by "B". As depicted in FIG. 1, the length of the major axis "A" is longer than the length of the minor axis "B" of the beam spot 120. The beam spot 120 may have an aspect ratio greater than one. The size of the beam spot in at least one dimension may correspond to a pixel. The size of the beam spot in at least one dimension may correspond to a sub-pixel. It should be noted that the shape and dimensions of the beam spot 120 are only exemplary and that the implementations described herein are also applicable to beam spots having other aspect ratios and shapes.

As depicted in FIG. 1, the conventional way for coupling abutting screens together is to place the transparent adhesive layer along the seam 106 in a manner where the sides of the transparent adhesive layer are parallel to each other and to the seam, where the seam is running vertically, holding the two sides of the adjacent screen portions together. In phosphor display systems, as will be described below, the phosphor stripes are typically regions where the scanning beam is on and the regions between the phosphor stripes are typically regions where the scanning beam is off. Attempts have been made to place the edges of the transparent adhesive layer in the regions where the scanning beam is off so as to minimize the light source being on at the junction of the edge of the transparent adhesive layer preventing light scattering that will be seen be a screen viewer. However, as the demand for higher resolution screens increases, the width of these regions where the scanning beams are off becomes smaller and smaller (e.g., 50 microns or less). Placing both edges of the transparent adhesive layer within such small widths has lead to mechanical tolerance problems. Even in situations where it is possible to align one major edge of the transparent adhesive layer in a region where the scanning beam is off, it is nearly impossible to also align the other major edge of the transparent adhesive layer within an area where the scanning beam is off.

As depicted in FIG. 1, the length "A" of the major axis of the beam spot 120 is much greater than the length "B" of the minor axis of the beam spot 120, so when the beam spot 120 hits either the major edge 110A, 110B of the transparent adhesive layer 104, the major edge 110A, 110B is parallel to both the seam 106 and the major axis "A" of the beam spot 120. Thus the major edge 110A, 110B infringes on a large section/percentage of the area of the beam spot 120 which causes shadowing. Thus, although the screens are held together with a transparent adhesive layer and the edges of the transparent adhesive layer are placed in locations where the scanned beam is either off or mostly off, there are still some internal reflections that make the major edges 110A, 110B visible to the screen viewers.

The inventors have surprisingly found that by making the taping of the seams not uniformly perpendicular to the beam swath (e.g., the major axis of the beam spot 120) or seam the highlighting/shadowing of the major edge of the transparent adhesive layer is removed. This may be achieved by making the significant portions of the major edges of the transparent adhesive layer "non-straight" or oblique.

Figure 2:
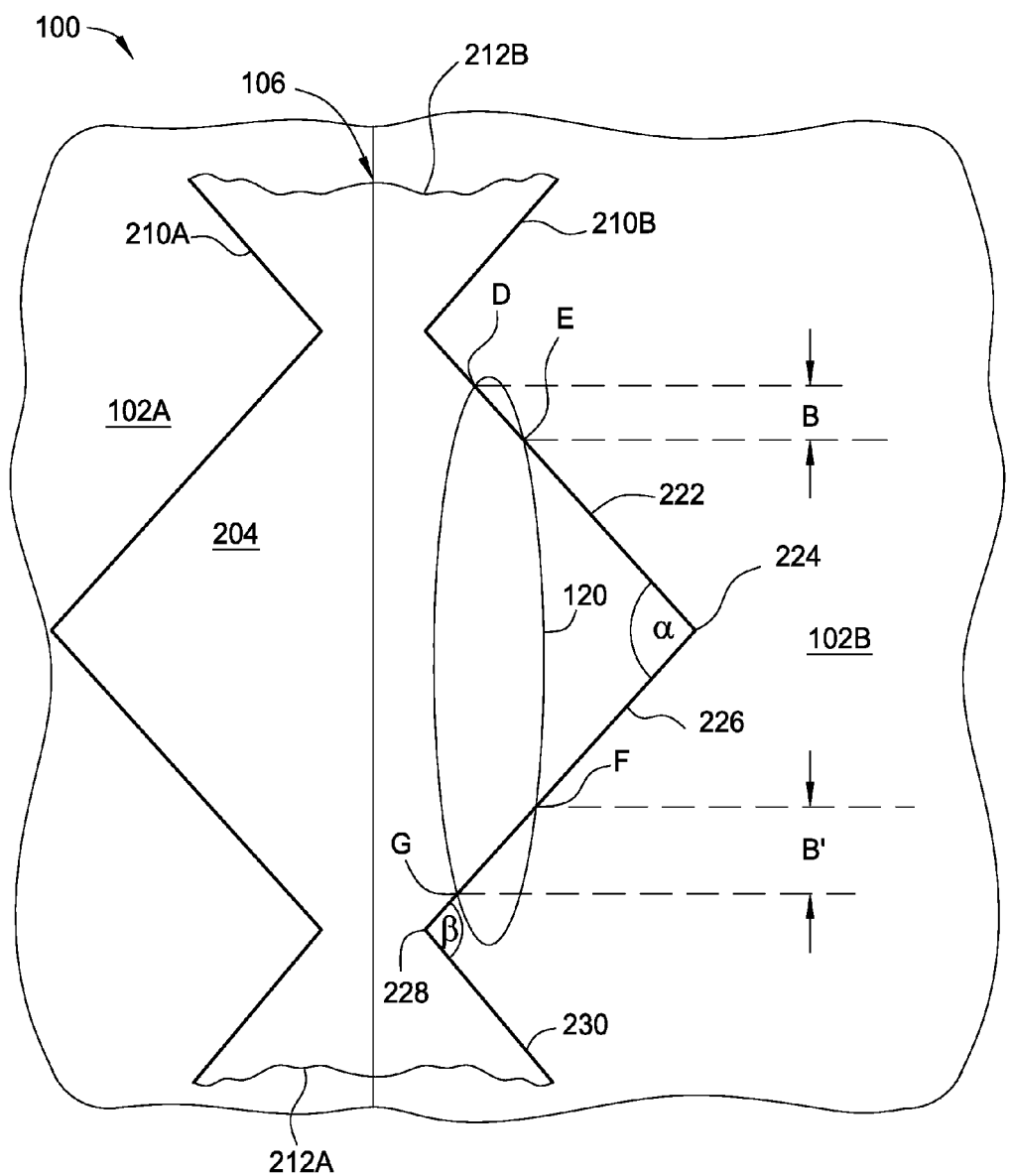
FIG. 2 is a schematic diagram of one implementation of a display system using adhesive layer to couple two adjacent screens together to produce a large seamless screen according to implementations described herein.

FIG. 2 is a schematic diagram of one implementation of a display system 100 using transparent adhesive layer 204 to couple two adjacent display screens 102A, 102B together to produce a large seamless screen according to implementations described herein. The transparent adhesive layer 204 is transparent. The seam 106 is formed between the abutting edges of the display screens 102A, 102B. The transparent adhesive layer 204 has two opposing major edges 210A, 210B which are positioned on opposite sides of the seam 106 and two parallel minor edges 212A, 212B which are positioned perpendicular to the seam 106. As previously discussed, the side of the transparent adhesive layer 204 contacting the display screens 102A, 102B has an adhesive fastener disposed thereon and operable to couple the two display screens 102A, 102B together. The adhesive fastener may be an acrylic adhesive selected to optimally adhere to the respective surfaces of each display screen 102A, 102B.

Unlike the major edges 110A, 110B of transparent adhesive layer 104, the major edges 210A, 210B of the transparent adhesive layer 204 are "non-straight" or oblique so as to minimize the total surface area of the major edge of the transparent adhesive layer that falls within the beam spot produced by the scanning beam. In one exemplary implementation as shown in FIG. 2, the major edges 210A, 210B of the transparent adhesive layer 204 may be described as serrated, zigzagged or "triangular". As depicted in FIG. 2, the serrated design of major edge 210B reduces the portions of the major edge 210B represented by C and C' that are illuminated by the beam spot 120. For example, any two points of intersection of the perimeter of the beam spot 120 with the major edge 210B of the transparent adhesive layer forms a line segment (line segment DE and line segment FG) which is less than the length "A" of the major axis of the beam spot 120. It should be noted that although major edges 210A, 210B of the transparent adhesive layer 204 are serrated, other edge designs, for example, edges having a sine waveform patterns or a non-sinusoidal waveform pattern which reduce the portion of the major edge illuminated by the beam spot 120, may be used. Exemplary non-sinusoidal waveform patterns which may be used to define the major edges of implementations described herein include triangle waveform patterns, saw tooth waveform patterns and square waveform patterns.

As depicted in FIG. 2, each triangular portion of major edge 210A, 210B has a linearly upward edge portion 222 that ramps up to form a peak 224 with a linearly downward edge portion 226. The linearly downward edge portion 226 ramps downward to form a trough 228 with an adjacent linearly upward edge portion 230. An angle "α" is formed between the linearly upward edge portion 222 and the linearly downward edge portion 226. The angle "α" is typically an oblique angle. In some implementations, the angle "α" may be from about 20 degrees to about 65 degrees (e.g., from about 45 degrees to about 55 degrees; about 50 degrees). An angle "β" is formed between the linearly downward edge portion 226 and the linearly upward edge portion 230. The angle "β" is typically an oblique angle. In some implementations, the angle "β" may be from about 20 degrees to about 65 degrees (e.g., from about 45 degrees to about 55 degrees; about 50 degrees).

Table I depicts the results for a simulation for various oblique angles of tape.

| Oblique Angle of Tape | Height of Beam Spot | % Height of Beam Spot |
| --- | --- | --- |
| 45 | 400 | 40% |
| 50 | 478 | 48% |
| 55 | 571 | 57% |
| 60 | 693 | 69% |
| 65 | 858 | 86% |
| 70 | 1000 | 100% |
| 75 | 1000 | 100% |
| 80 | 1000 | 100% |
| 85 | 1000 | 100% |
| 90 | 1000 | 100% |

Figure 3:
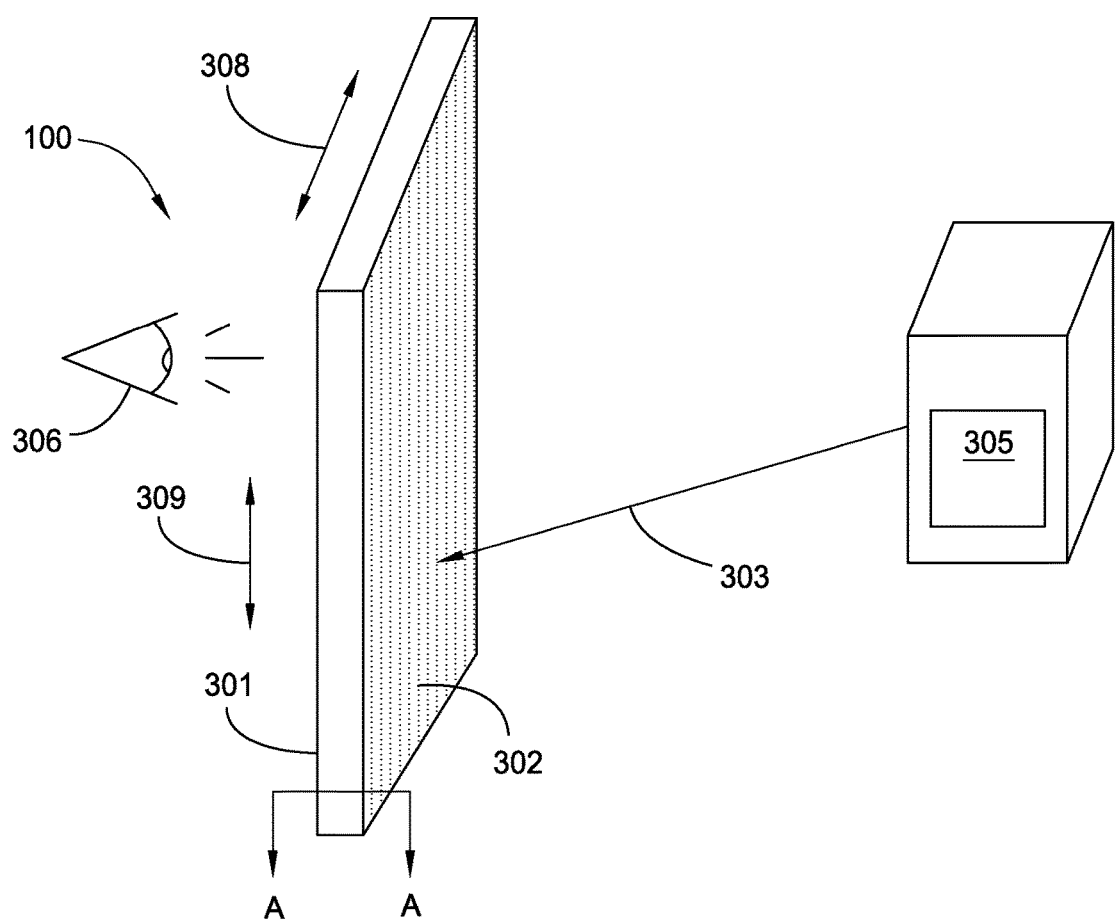
FIG. 3 is a perspective schematic diagram of a display system according to implementations described herein.

FIG. 3 is a perspective schematic diagram of the display system 100 according to implementations described herein. Display system 100 is a light-based electronic display device configured to produce video and static images for a viewer 306 positioned on a viewer side of the display screen. The display system 100 can incorporate light-emitting phosphors. For example, display system 100 may be a LPD or other phosphor-based display device. In some implementations, display system 100 is one of a plurality of display systems that are arranged to form a single tiled display screen.

In one implementation, the display system 100 can have a display screen 301 with phosphor stripes 302 and the scanning light generator 305, for example, a laser module, used to produce one or more scanning laser beams or excitation light beams 303 to excite the phosphor material on the display screen 301. The scanning light generator 305 is positioned on an excitation side of the display screen 301 which is opposite the viewer 306. Phosphor stripes 302 are made up of alternating phosphor stripes of different colors, e.g., red, green, and blue, where the colors are selected so that they can be combined to form white light and other colors of light. The phosphor stripes 302 are configured to receive light from the scanning light generator 305 and produce one or more wavelengths of light in response to the light received. Scanning laser beam 303 is a modulated light beam that includes optical pulse width and/or amplitude variable pulses that carry image information and is scanned across the display screen 301 along two orthogonal directions, e.g., horizontally (parallel to arrow 308) and vertically (parallel to arrow 309), in a raster scanning pattern to produce an image on the display screen 301 for the viewer 306 positioned on the viewer side of the display screen 301.

In some implementations, scanning laser beam 303 includes visible lasers beams of different colors that discretely illuminate individual pixel elements of the display screen 301 to produce an image. The scanning laser beam 303 can be of a specific width and height, so as to excite only a specific phosphor or group of phosphors at one time, such as a scanning laser beam which is approximately 700 μm tall and approximately 100 μm wide. In other implementations, scanning laser beam 303 includes invisible laser beams, such as near-violet or ultra-violet (UV) laser beams that act as excitation beams to excite phosphors on the screen. In such implementations, scanning laser beam 303 is directed to discrete pixel elements that are formed from phosphor stripes 302 or to portions of phosphor stripes 302 that act as discrete pixel elements and are made up of light-emitting material that absorbs optical energy from scanning laser beam 303 to emit visible light and produce an image. The laser beams may pass through a coextruded multi-layered filter that passes the UV laser beams in one direction, but reflects visible light in the opposite direction. Alternatively, the phosphor stripes may be segmented phosphor regions. Alternatively, scanning laser beam 303 may be comprised of hybrid visible and invisible lasers. For example, a blue laser can be used to generate blue color on the display screen 301, and the same blue laser could be used to excite phosphors that emit red and green light when excited. Alternatively, a UV laser may be used to excite phosphors that emit green light when excited, and a red and blue laser may be used to produce red and blue color directly on the screen.

A feedback control alignment mechanism can be provided in the system in FIG. 3 to maintain proper alignment of the scanning laser beam 303 on the desired sub-pixel to achieved desired image quality. The display screen 301 is used to provide a screen feedback by reflecting feedback light in a specular or diffuse manner to a detector to indicate the alignment status of the scanning laser beam 303. When the alignment has an error, the control module within the scanning light generator 305 responds to the error in the screen feedback to control the scanning laser beam 303 to compensate for the error. Such feedback control can include reflective or transmissive reference marks on the display screen 301, both in the fluorescent area either in line with the phosphor stripes or between the phosphor stripes and in one or more peripheral area outside the fluorescent area, to provide feedback light that is caused by the scanning laser beam 303 or a separate invisible laser beam (for example an IR beam from an IR laser) and represents the position and other properties of the scanning beam on the display screen 301. The reference marks may be on the excitation side of the display screen 301. The feedback light can be measured by using one or more optical servo sensors to produce a feedback servo signal. A servo control in the scanning light generator 305 processes this feedback servo signal to extract the information on the beam positioning and other properties of the beam on the screen and, in response, adjust the direction and other properties of the scanning laser beam 303 to ensure the proper operation of the display system.

In one example, a feedback servo control system can be provided to use peripheral servo reference marks positioned outside the display area, unobservable by the viewer, to provide control over various beam properties. The various beam properties can include the horizontal positioning along the horizontal scanning direction perpendicular to the fluorescent stripes, the vertical positioning along the longitudinal direction of the fluorescent stripes, the beam focusing on the screen for control the image sharpness, and the beam power on the screen for control the image brightness and beam positioning of one or more beams in relations to other beams. In another example, a screen calibration procedure can be performed at the startup of the display system to measure the beam position information as a static calibration map. By creating the static calibration map, the exact positions of sub-pixel imaging on the screen will be known. This calibration map is then used by the scanning light generator 305 to control the timing and positioning of the scanning laser beam 303 to achieve the desired color purity. In another example, a dynamic servo control system can be provided to regularly update a preexisting static calibration map during the normal operation of the display system. The update of the preexisting calibration map can be performed by using servo reference marks in non-emission regions of the fluorescent area of the screen to provide the feedback light without affecting the viewing experience of a viewer.

The non-emission regions, as disclosed above, are a type of reduced, limited or no light propagation or emission region. As used herein, non-emission light propagation regions are regions which either are not targeted to receive light from a light source (e.g. the region is not targeted by the scanning laser beam 303 and the region is not disposed directly (or only partially) in the light path between the viewer and the phosphor stripes 302, when the phosphor regions are emitting light in a lambertian manner, when excited by the excitation light). This is in contrast to the light propagation regions, usually between the non-emission light propagation regions, where either the light source is mostly directly intersecting the light propagation region or more directly in the light path between the viewer and the phosphor stripes 302, when the phosphor regions are emitting light.

Figure 4:
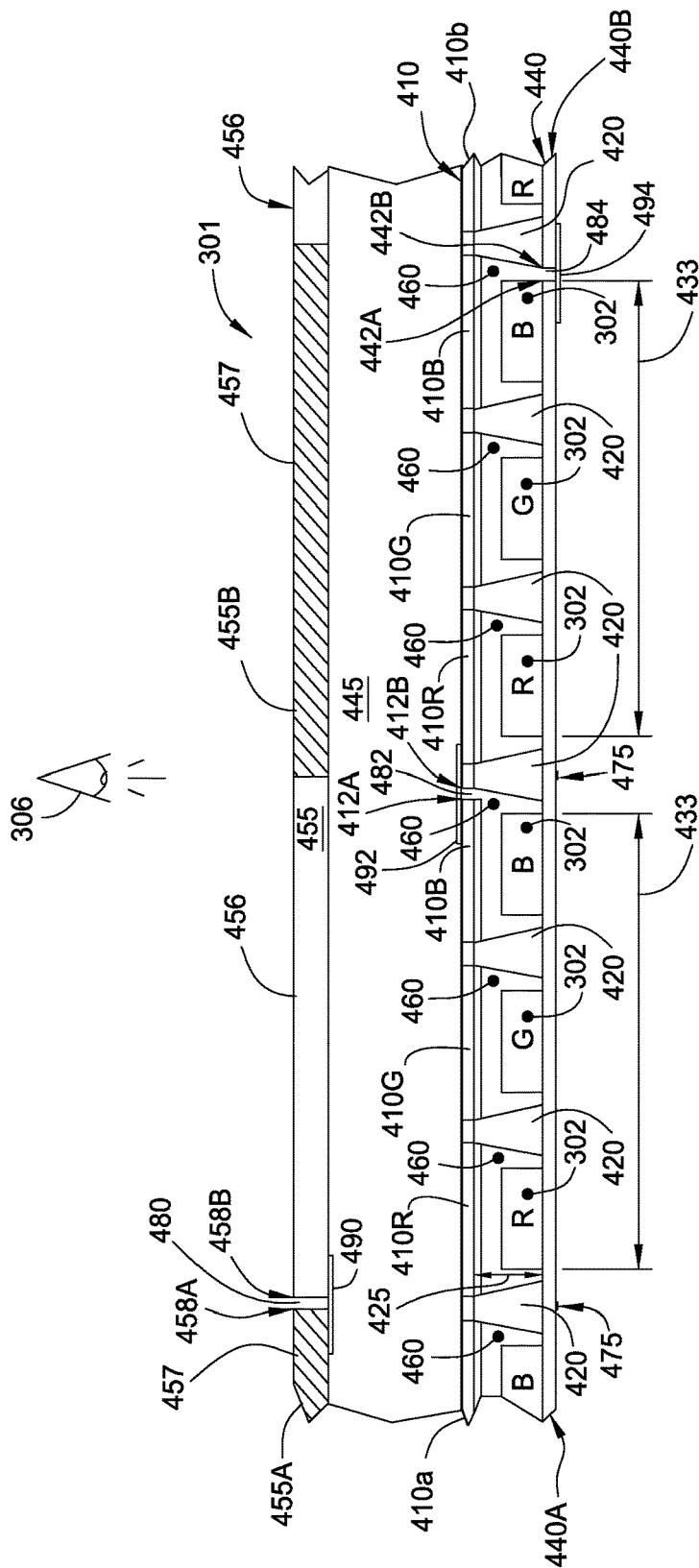
FIG. 4 is a partial cross-sectional schematic view of a display screen taken along section A-A of FIG. 3.

FIG. 4 is a partial cross-sectional schematic view of the display screen 301 taken along section A-A of FIG. 3. The display screen 301 can include a plurality of phosphor stripes 302 mounted on one or more substrates 440, one or more film patterned retarder (FPR) layers 455 and non-emission regions, such as standoff dividers 420 or "separator segments". The display screen 301 can further include one or more color filter layers 410 and a support layer 445.

As depicted in FIG. 4, the display screen 301 may include a plurality of substrates 440, a plurality of color filter layers 410 and a plurality of film patterned retarder layers 455. The plurality of film patterned retarder layers 455, depicted here as two adjacent film patterned retarder layers 455A, 455B positioned adjacent to each other. The film patterned retarder layers 455A, 455B can include a plurality of first edges, depicted here as two first edges 458A, 458B. Formed between the two first edges 458A, 458B is a first seam 480. The first seam 480 may be larger or smaller than shown here.

In one implementation, the color filter layer 410 can include a plurality of color filter layers 410, depicted here as two color filter layers 410a, 410b positioned adjacent to each other. The color filter layers 410a, 410b can further include a plurality of second edges, depicted here as two second edges 412A, 412B. A second seam 482 is formed between the second edges 412A, 412B.

The transparent substrate 440 can include a plurality of transparent substrates, depicted here as two transparent substrates 440A, 440B positioned adjacent to each other. In another implementation a transparent substrate layer might be a filter layer, where the substrate is transparent to light of a certain wavelength. The transparent substrates 440A, 440B can further include a plurality of second edges, depicted here as two second edges 442A, 442B. A third seam 484 is formed between the second edges 442A, 442B.

In some implementations, at least two of the first seam 480, the second seam 482 and third seam 484 may be aligned. In some implementations, at least two of the edges of color filter layers 410a, 410b, transparent substrates 440A, 440B and FPR layers 455A, 455B are aligned (e.g., the edge 458A of FPR layer 455A is aligned with at least one of the edge 412A of color filter layer 410a and/or the edge 442A of transparent substrates 440A).

The plurality of substrates 440, plurality of color filter layers 410 and plurality of film patterned retarder layers 455 may each be independently connected across the first seam 480, the second seam 482 and the third seam 484 or combinations thereof using transparent adhesive layers 490, 492 and 494 respectively. The transparent adhesive layers 490, 492 and 494 may be similar to any of transparent adhesive layers 204, 604, 624, 704, 724, 734, 904, 924, and 934 as described herein. The transparent adhesive layer 492 is depicted here as having edges which do not coincide with the standoff divider 420. However, in one or more implementations where transparent adhesive layer 492 is used, the edges of the transparent adhesive layer 492 are positioned adjacent to the standoff divider 420 to reduce visibility of the edges of the transparent adhesive layer 492.

Support layer 445 could be a combination of filter layers coated or pigmented to render various functions such as neutral density filter, or a spectral filter to enhance RGB color or block UV light. The color filter layer 410 and additional filter layers and FPR can be positioned on the layer surface of the display screen 301 facing the viewer 306, as determined from the scanning light generator 305. There could be an additional large monolithic polycarbonate or glass sheet (not shown) between the viewer 306 and the tiled screen material for safety reasons. The monolithic polycarbonate or glass sheet could serve other purpose of UV blocking layer or spectral density film. The transparent substrate 440 can be positioned on the opposite side of the display screen 301, and the phosphor stripes 302 can be disposed between the outer layers (outer layers are one or all e.g. 410, 445, 455) and transparent substrate 440 as shown. The transparent substrate 440 will be expanded on in greater detail in the next section. The display screen 301 as depicted with various components are greatly exaggerated both for visibility and to clarify aspects of the disclosure. Other desirable characteristics of the layers of the display screen 301 include having a low coefficient of thermal expansion and low moisture absorption, and being readily manufacturable in thin layers. In addition, the layers are preferably comprised of a material that is not brittle and does not break-down with exposure to UV light and discolor over the lifetime of the display system 100. In some implementations, the layers comprise polyethylene terephthalate (PET) films or other polymeric plastic films, which largely satisfies the above requirements. In addition, there is great benefit to having a plastic layered display screen 301 for rollability and transportation purposes. The color filter layer 410 is a thin substrate, typically plastic substrate which is less than 0.5 mm in thickness, and may be configured with filter elements 410R, 410G, and 410B that each narrow the gamut of the particular color light passing through the filter element. In general all the layers herein are relatively flexible substrates or sheets that are held in place by other structural elements of the display screen 301 be it standoffs or other structural elements. In the implementation illustrated in FIG. 4, the color filter layer 410 includes red, green, and blue filter elements, which are positioned to align with corresponding red, green, or blue phosphor stripes 302, denoted by R, G, and B, respectively. The filter elements 410R, 410G, and 410B may be formed with a lithographic or ink jet or gravure printing process on the requisite portions of the color filter layer 410 prior to the assembly of the display screen 301. In the implementation illustrated in FIG. 4, the filter elements 410R, 410G, and 410B are configured as elongated strips (perpendicular to page) that, like the phosphor stripes 302 and the standoff dividers 420, extend vertically across the display screen 301, i.e., parallel to arrow 309 in FIG. 3.

The standoff dividers 420 separate the phosphor stripes 302 from each other and prevent the outer layers from touching the phosphor stripes 302. Thus, the standoff dividers 420 form a first region 460 around each of the phosphor stripes 302. One example material for the standoff dividers 420 is a photosensitive resin. Alternative means for the standoff material is a patterned polymer. The photosensitive resin may be applied as an imageable photo-resist laminate to a substrate, such as the color filter layer 410 or other planar structural member, and selectively exposed to the requisite light energy, such as UV light and the remainder of the photo-resist laminate removed. The polymer standoff can be also formed by either a replication process using planar molds or roll to roll process using cylindrical molds with UV curing applied. When patterned appropriately, the standoff dividers 420 can be formed in the desired regions on the substrate. Note that if the color filter layer 410 is not present, the standoff dividers can be formed on any other outer layer including a passive transparent layer. As shown, the standoff dividers 420 come in touch with the transparent substrate 440 and are usually contact glued to the substrate for good adhesion and structural integrity. In some implementations, the standoff dividers 420 are configured as elongated strips positioned between the phosphor stripes 302. In one implementation, the standoff dividers 420 have a height 425 of between about 50 and 100 μm or greater than the phosphor height region.

One or more phosphor stripes 302 are formed from the phosphor stripes 302 and are configured to emit light of a frequency range which is detected by a viewer as a color or combination of colors when one or more of the phosphor regions are excited by an excitation beam, such as scanning laser beam 303. Thus, each pixel of the display screen 301 may include one or more phosphor stripes 302, where each phosphor stripes 302 acts as a sub-pixel of a larger pixel. In the implementation illustrated in FIG. 4, one dimension of a pixel, i.e., pixel width 433 is defined by the width of three phosphor stripes 302, and the orthogonal dimension, i.e., out of the page, or vertical, is defined by the excitation laser beam spot size. In such an implementation, because the phosphor stripes 302 are continuous stripes, the vertical position of each pixel is not fixed and may be selected as desired by adjusting the vertical position at which the excitation laser beam is directed to each of the phosphor stripes 302. In other implementations, the standoff dividers 420 may define both dimensions of each of the phosphor stripes 302, so that the phosphor stripes 302 are separated on all sides from adjacent phosphor regions by the standoff dividers 420 formed in a grid pattern. Each of the phosphor stripes 302 is spaced at a pitch of X μm, so that pixel width 433 of a pixel on the display screen 301 is 3X μm. For example if X=400 um the pixel pitch is 1200 um. In one implementation, each of the phosphor stripes is spaced at a pitch of 400 μm with a pixel pitch of 1200 μm. In yet other implementations, the pixel of the display screen 301 may include separate phosphor regions rather than portions of the phosphor stripes 302. For example, each sub-pixel may be a discrete and isolated phosphor dot or rectangle of one particular light-emitting phosphor material.

The transparent substrate 440 is the first layer lit by the scanning light generator 305 by prior to the light reaching the phosphor stripes 302. Transparent substrate 440 contains multiple functions such as high transmission of UV light, reflecting light for servo purposes, and efficiently recycling the visible light to the viewer. It contains at least a co-extruded multi-layer film and a servo printed layer. The servo printed layer with servo marks 475 is normally aligned with the standoff region so that it does not hinder the UV light reaching the phosphor stripes 302. The support layer 445 can be positioned over the phosphor stripes 302. The support layer can be a solid transparent surface which substantially or completely covers the phosphor stripes 302. The support layer 445 can be in connection with the color filter layer 410 or it can be in connection with the first region 460. The support layer can be relatively thick in comparison to the phosphor region but is still relatively flexible. The support layer 445 need not be transparent to UV light. In one implementation, a UV filtering layer (not shown) may be used to prevent UV light from reaching the viewer 306. In another implementation, the transparent surface may be either selected for or adapted against UV transparency.

The FPR 455 is a transparent or partially transparent sheet. The FPR 455 can be composed of multiple layers. In one implementation, the multiple layers includes a polarizing film, such as triacetyl cellulose (TAO) film, which can be used to polarize the light emanating for the phosphor stripes 302. The multiple layers can further include alternating left and right circularly polarizing wave plates, which are used to separate information to the viewer wearing polarization glasses. The FPR 455 can be positioned over the support layer 445 over the color filter layer 410, or directly over the phosphor stripes 302 thereby creating the first region 460 in conjunction with the standoff dividers 420. The FPR 455 can create a plurality of right and left circular polarization regions that with complement circular polarization eyewear establishes distinct left eye polarization regions 456 and right eye polarization regions 457. The FPR regions 456 and 457 can be separated into various organizations, such as columns, rows, checkerboard patterns or other formations which would allow an approximately equal division of the image produced on the display screen 301 between the left eye polarization regions 456 and the right eye polarization regions 457. The FPR 455 can be arranged in columns that correlate to the pixel width 433.

The FPR 455 useable with implementations of the present disclosure can be any film or layer which de-correlates two images presented in an interleaved manner simultaneously so as to create multiple images for the viewer 306, such as a stereo image used to generate the illusion of 3D. Exemplary implementations can include a FPR or a film patterned color-shifter. An LCD-based display system configured with a FPR is described in greater detail in U.S. Pat. No. 5,327,285, entitled "Methods for manufacturing micropolarizers" and granted Jul. 5, 1994, and is incorporated by reference herein. A projector based system configured with a film patterned color shifter is described in greater detail in U.S. Pat. No. 7,959,295, entitled "Spectral separation filters for 3D stereoscopic D-cinema presentation" and granted Jun. 14, 2011, and is incorporated by reference herein.

The scanning light generator 305 (shown in FIG. 3) forms an image on the display screen 301 by directing the scanning laser beam 303 to phosphor stripes 302 and modulating scanning laser beam 303 to deliver a desired amount of optical energy to each phosphor stripes 302 of the display screen 301. Each phosphor stripe 302 outputs light for forming a desired image by the emission of visible light created by the selective laser excitation thereof by scanning laser beam 303. Some of the light emitted by the phosphor stripes 302 will be incident on the standoff dividers 420, which may absorb and/or transmit said light, depending on the material from which the standoff dividers 420 are formed and the angle of incidence of the light with respect to the surfaces of the standoff dividers 420. Transmission of incident light from the phosphor stripes 302 into an adjacent phosphor region allows colors from different phosphor regions to mix, thereby degrading color purity of the image, while absorption of such light reduces the amount of light that ultimately reaches the viewer 306. Implementations of the disclosure contemplate the use of a material having a low-index of refraction that is disposed in the first region 460 between phosphor stripes 302 and the standoff dividers 420. The presence of the low-index material in the first region 460, which may be the standoff dividers 420 or any separation between the phosphor regions, minimizes the absorption and/or transmission by the standoff dividers 420 of light emitted by phosphor stripes 302, thereby allowing more of the light emitted by phosphor stripes 302 to propagate through the color filter layer 410 and reach the viewer 306. In another implementation, the first region 460 may also be immediately adjacent the phosphor stripes 302 on the side toward the viewer 306. Alternatively the first region 460 can be air.

The image produced on the display screen 301 will be filtered through the FPR 455. The FPR 455 in combination with the polarizer will polarize the light produced by the phosphor stripes 302. Only light of a certain polarity will be allowed through the FPR 455 due to the mated linear polarizer. The circular polarization phasing of the light allowed through the FPR 455 is different between the right eye regions 456 and the left eye regions 457. The light passing through the right eye regions 456 corresponds to a first image and the light passing through the left eye regions 457 corresponds to a second image. Therefore, one image will be circularly polarized phase shifted with the other. The viewer 306 will have an appropriate circularly polarized phase filtering viewer device (not shown) which allows the viewer to see the first image with the right eye and the second image with the left eye.

In the implementation illustrated in FIG. 4, the display screen 301 can include a reflective servo layer (not shown) and a reflector film (not shown). Further the reflective servo layer can have a plurality of positioned marks disposed thereon. When the laser hits at least one of the plurality of positioned marks, the laser will either be dispersed or reflect back to the servo (not shown). Based on known positioning and shape of the plurality of positioned marks, the position of the reflected laser can be determine based on calculable parameters, such as reflection angle and time of receipt. An LPD-based display system configured with a servo beam is described in greater detail in U.S. Patent Application Publication No. 2010/0097678, entitled "Servo Feedback Control Based on Designated Scanning Servo Beam in Scanning Beam Display Systems with Light-Emitting Screens" and filed Dec. 21, 2009, and is incorporated by reference herein.

Though described as including transparent substrate 440 with phosphor stripes 302, it is envisioned that the methods described herein could be beneficially applied to other image devices. The type of image production in the multi-layer display screen 301 is not intended to be limiting of possible implementations.

Figure 5A:
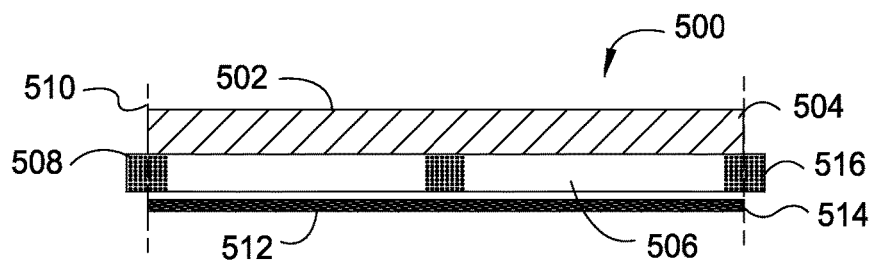
FIGS. 5A-5C are cross-sectional schematic views of a multi-layer display screen according to implementations described herein.
Figure 5B:
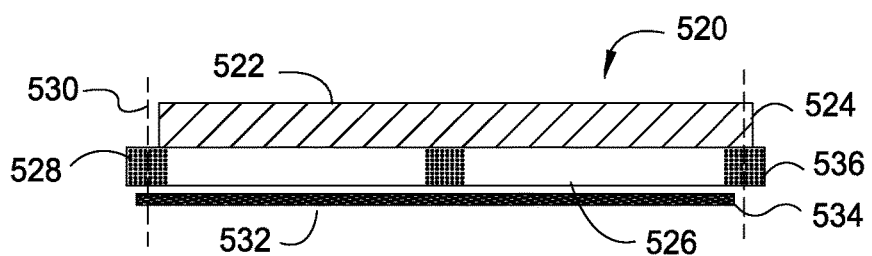
Figure 5C:
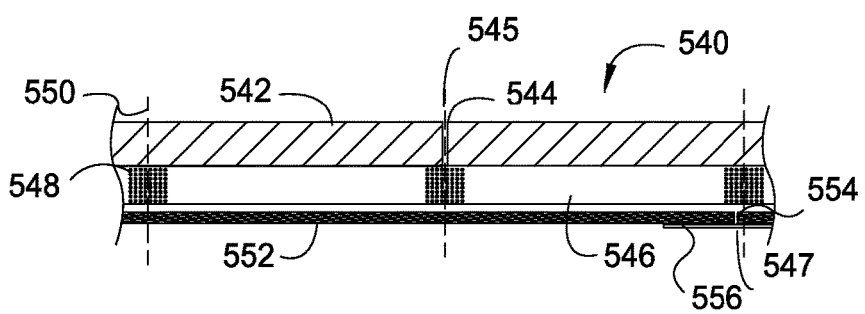

FIGS. 5A-5C are cross-sectional schematic views of a multi-layer display screen 500 according to implementations described herein. Certain implementations, described herein include positioning the edge regions in conjunction with light propagation regions, such as non-emission regions, formed in one or more layers or regions between primary light emitting regions. Further implementations described herein disclose the formation of non-overlapping edge regions in the overlying layers. By controlling the position and the transmission of light through the edge regions, the visibility of the edge regions to the viewer can be diminished and in some cases eliminated. The elements of various implementations are exaggerated for clarity.

FIG. 5A depicts a multi-layer display screen 500 according to one implementation. The multi-layer display screen 500 can include a first layer 502. The first layer 502 can be a partially transmissive layer, such as a UV filtering layer or a color filter layer. The first layer can include a plurality of first edges 504. The number of first edges 504 will correspond to the number of sides in the plane of the first layer 502. As two sides in a plane of the first layer 502 are visible from this perspective, two first edges 504 are also visible.

The first layer 502 can be formed over a second layer 506. The second layer 506 can be one or more layers described above with reference to FIG. 4, such as a phosphor layer. In one implementation, the second layer is the transparent substrate 440. The second layer 506 can have one or more non-emission regions 508, shown here as three (3) non-emission regions 508. The non-emission regions 508 can be formed either on or in the second layer 506. The non-emission regions 508 can be bisected by an imaginary bisecting line 510. The first edges 504 are formed adjacent to the non-emission regions 508, shown here as being flush with the imaginary bisecting lines 510. As with the first layer 502, the second layer 506 has a plurality of second edges 516, shown here as two second edges 516.

A third layer 512 can be formed in connection with the second layer 506. The third layer 512 can be a feedback layer, such as a servo layer. The third layer 512 can have a plurality of third edges 514. As with the first layer 502, the number of third edges 514 will correspond to the number of sides in a plane of the third layer 512. As two sides of the third layer 512 are visible from this perspective, two third edges 514 are also visible. Shown here, the third edges 514 are also in line with the imaginary bisecting line 510 of the non-emission regions.

The positioning of the edges shown here allows for greater control of the visibility of these edges to the viewer. As the first edges 504 and the third edges 514 are formed in conjunction with a non-emission region 508, and the second edges 516 are formed at the non-emission regions 508, light from the light source or scanning laser beam is not transmitting in a manner that causes imaging (as in that the excitation light may be off during this period of the scan) through the first edges 504, the second edges 516 and the third edges 514. This prevents reflection or refraction at the first edges 504, the second edges 516 and the third edges 514, making the first edges 504, the second edges 516 and the third edges 514 less visible. Though shown as only three layers, it is understood that a multi-layer display screen 500 may have more or fewer layers depending on the needs of the viewer.

FIG. 5B depicts a multi-layer screen 520 according to another implementation. The multi-layer screen 520 shown here includes a first layer 522, a second layer 526 and a third layer 532. The first layer 522 can include a plurality of first edges 524, depicted here as two first edges 524. The second layer 526 can include a plurality of non-emission regions 528 and a plurality of second edges 536, depicted here as three non-emission regions 528 and six second edges 536 respectively. The third layer 532 includes a plurality of third edges 534, depicted here as two third edges 534.

The first edges 524, the second edges 536 and the third edges 534 are each shown in relation to an imaginary bisecting line 530, which bisects the non-emission regions 528. The first edges 524 shown here as not aligned with the imaginary bisecting line 530, the second edges 536 or the third edges 534. The second edges 536 and the third edges 534 are also not aligned with the imaginary bisecting line 530 or one another. This avoids a common edge between the first edges 524, the second edges 536 and the third edges 534. Though the first edges 524, the second edges 536 and the third edges 534 are not aligned, each edge is capable of being formed adjacent to a non-emission region.

FIG. 5C depicts a multi-layer tiled screen 540 according to another implementation. The multi-layer tiled screen 540 includes a plurality of first layers 542, a plurality of second layers 546 and a plurality of third layers 552. The plurality of first layers 542, depicted here as two first layers 542 can include a plurality of first edges 524, depicted here as two first edges 544. Formed between the two first edges 544 is a first seam 545. The first seam 545 may be larger or smaller than shown here. The second layer 546 can include a plurality of non-emission regions 548, depicted here as three non-emission regions 548. The second layer 546 can further include a plurality of second edges, similar to those shown in relation to FIGS. 5A and 5B. The third layer 552 includes a plurality of third edges 554, depicted here as two third edges 554. As with the first layer 542, the third layer 552 can include a third seam 547 formed between the plurality of third edges 554. The screens 540 can be connected across the first seam 545, the third seam 547 or combinations thereof using a transparent adhesive layer 556, shown here as connected across the third seam 547 using the transparent adhesive layer 556. The transparent adhesive layer 556 may be similar to any of the transparent adhesive layers 204, 604, 624, 704, 724, 734, 904, 924, and 934 as described herein. The transparent adhesive layer 556 is depicted here as having edges which do not coincide with the non-emission regions 548. However, in one or more implementations where transparent adhesive layer 556 is used, the edges of the transparent adhesive layer 556 are positioned adjacent to the non-emission regions to reduce visibility of the edges of the transparent tape.

As described previously, the first edges 544 and the third edges 554 are each shown in relation to an imaginary bisecting line 550, which bisects the non-emission regions 548. The first edges 544 shown here as not aligned with the imaginary bisecting line 550, the second edges or the third edges 554. The second edges are not aligned with the imaginary bisecting line 550. Further, the first edges 544 and the third edges 554 are not layer adjacent to the same non-emission region, thus avoiding a common edge between the first edges 544 and the third edges 554 and a common seam between the first seam 545 and the third seam 547.

It is believed that avoiding a common edge provides further support to the multi-layer tiled screen 540. When a common edge is used in available tiled designs, the common edge becomes a flex point for the screen. This flex point allows for both ready bending of the screen, stress on the adhesive connection and transference of force to abutting screens. The overlap of the offset edges in the layers of the multi-layer tiled screen 540 creates a continuous sheet and provides additional stability to the multi-layer tiled screen 540. The lamination of the sheet layers using one or many adhesive techniques adds the creation of a sturdy and stable large overall compound single sheet, made up of smaller sheets each sheet comprising layers, which as shown above are interleaved together and laminated one layer to another.

Though FIGS. 5A-5C are described with reference to the first edges, the second edges and the third edges positioned in optical connection with a non-emission region, non-emission regions are not necessary for the implementations described herein. Specifically, in one or more implementations, the non-emission regions can be replaced with a region which does not receive light or radiation from the scanning laser beam or other internal light sources. In this implementation, the edge seam formed between the edges will be between the emission areas on the viewer side (such as between the phosphor regions) and between the regions receiving the scanning laser beam on the light engine side. In this way, the excitation beam never hits the edge seam or the edges and the emission from the phosphors only minimally hits the edge seam or edges.

Beam scanning in the display systems described in this disclosure can be implemented by two scanners that scan the excitation beams of light in two orthogonal directions, e.g., the horizontal and vertical directions. The horizontal scanner can be implemented by a polygon and the vertical scanner can be implemented by a galvo scanner. Various scanning techniques can be implemented to operate the two scanners to scan the excitation beams.

Given that a system is depicted in this implementation, it is understood that further adjustment is possible to ensure less visibility of horizontal and vertical gaps in the final the display screen 301 in front of the scanning light generator 305. Even though the edges and corresponding gaps are in the non-emission regions or near scan line, the edges might still show up as dimming or discolored line artifacts on the screen. This can be addressed by boosting the scanning laser beam 303 by the scanning light generator 305 around the area of the phosphor stripes 302 in proximity to the gaps. Examples are, in the vertical edge case: if the edge is in the non-emission region at the Blue to Red boundary, the scanning laser beam 303 can be boosted for one or two subpixels around that gap for that subpixel area. Similarly, in the horizontal edge case: the horizontal scan line produced by the scanning laser beam 303 in the scan can be adjusted in intensity depending on its location relative to the horizontal gap.

Figure 6A:
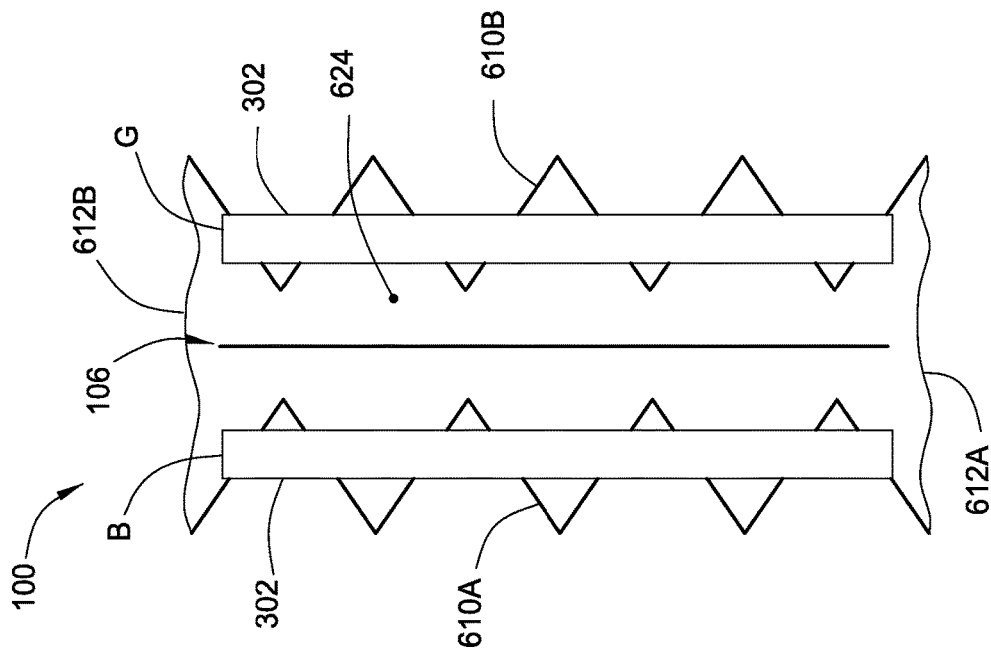
FIGS. 6A-6B are schematic diagrams of other implementations of an adhesive layer coupling two adjacent screens together to produce a large seamless screen according to implementations described herein.
Figure 6B:
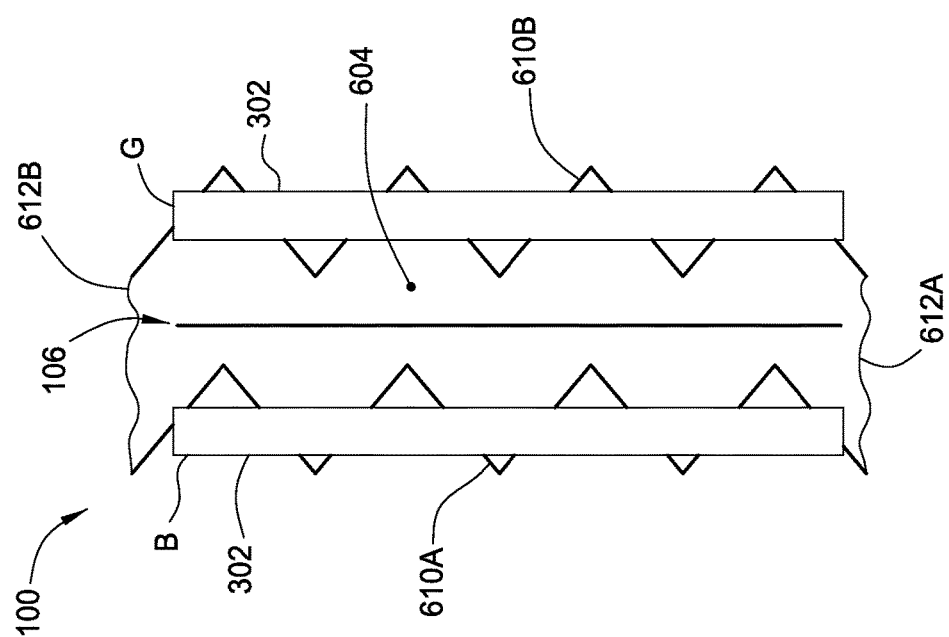

FIGS. 6A-6B are schematic diagrams of other implementations of the adhesive layer coupling two adjacent screens together to produce a large seamless screen according to implementations described herein. FIG. 6A is a schematic diagram of one implementation of display system 100 using the adhesive layer 604 to couple two adjacent screens together to produce a large seamless screen according to implementations described herein. The positioning of the adhesive layer 604 relative to phosphor stripes 302 and the seam 106 is depicted. The adhesive layer 604 is similar to the adhesive layer 204. The adhesive layer 604 is transparent. The seam 106 is formed between the abutting edges of the display screens 102A, 102B. The adhesive layer 604 has two opposing major edges 610A, 610B which are positioned on opposite sides of the seam 106 and two parallel minor edges 612A, 612B which are positioned perpendicular to the seam 106. As previously discussed, the side of the adhesive layer 604 contacting the display screens has an adhesive fastener disposed thereon and operable to couple the two display screens 102A, 102B together. The adhesive fastener may be an acrylic adhesive selected to optimally adhere to the respective surfaces of each display screen 102A, 102B.

Similar to the major edges 210A, 210B of the adhesive layer 204, the major edges 610A, 610B of adhesive layer 604 are "non-straight" or oblique so as to minimize internal reflections that make the major edges 110A, 110B visible to the screen viewers. The major edges 610A, 610B of adhesive layer 604 are serrated or "triangular".

FIG. 6B is a schematic diagram of one implementation of display system 100 including adhesive layer 624 to couple two adjacent screens together to produce a large seamless screen according to implementations described herein. The adhesive layer 624 is similar to both adhesive layer 204 and adhesive layer 620 except that major side 610B of adhesive layer 624 is shifted such that major side 610A and major side 610B of FIG. 6B are mirror images of each other.

Figure 7C:
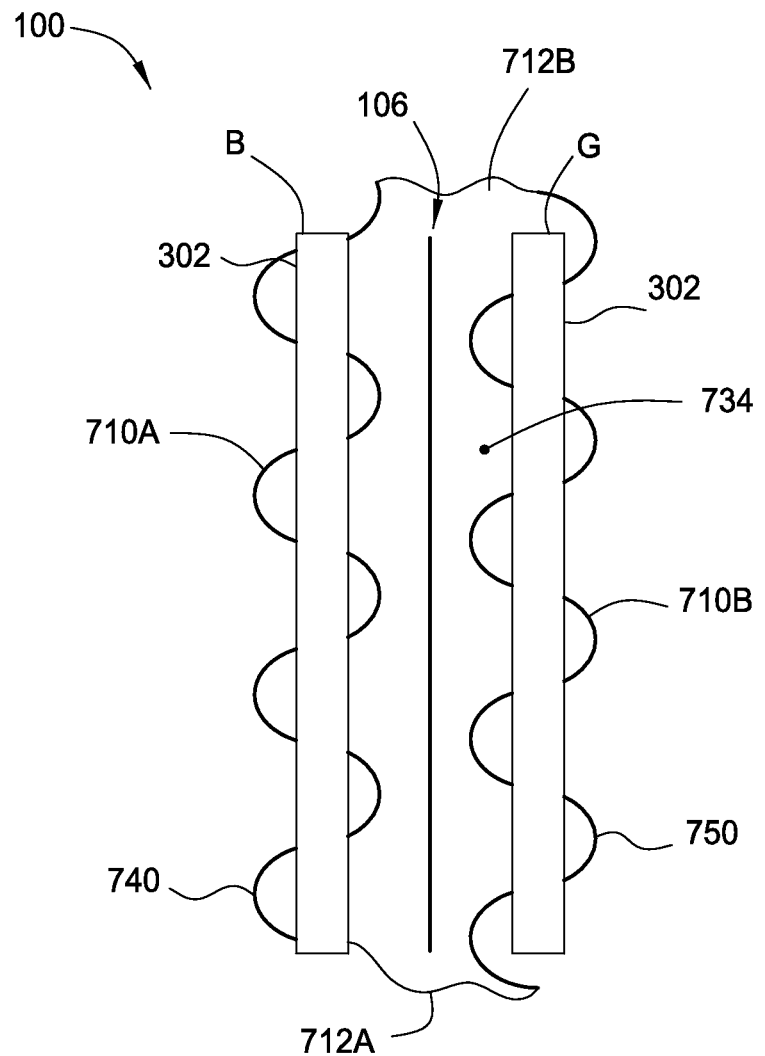

FIGS. 7A-7C are schematic diagrams of other implementations of display system 100 including adhesive layer coupling two adjacent screens together to produce a larger seamless screen according to implementations described herein. FIG. 7A is a schematic diagram of one implementation of display system 100 using adhesive layer 704 to couple two adjacent screens together to produce a large seamless screen according to implementations described herein. The positioning of the adhesive layer 704 relative to phosphor stripes 302 and the seam 106 is depicted. The adhesive layer 704 is similar to adhesive layers 204, 604 and 624 except that the major edges 710A, 710B are designed to mimic a sinusoidal wave pattern. The adhesive layer 704 is transparent. The seam 106 is formed between the abutting edges of the display screens 102A, 102B. The adhesive layer 704 has two opposing major edges 710A, 710B which are positioned on opposite sides of the seam 106 and two parallel minor edges 712A, 712B which are positioned perpendicular to the seam 106. As previously discussed, the side of the adhesive layer 704 contacting the display screens has an adhesive fastener disposed thereon and operable to couple the two display screens 102A, 102B together.

Similar to the major edges 210A, 210B of adhesive layer 204, the major edges 710A, 710B of adhesive layer 704 are "non-straight" or oblique so as to minimize the total surface area of the major edge of the adhesive layer that falls within the beam spot produced by the scanning beam. However, the major edges 710A, 710B of adhesive layer 704 are designed to mimic a sinusoidal waver pattern rather than a triangular pattern.

FIG. 7B is a schematic diagram of one implementation of display system 100 including adhesive layer 724 to couple two adjacent screens together to produce a larger seamless screen according to implementations described herein. The adhesive layer 724 is similar to adhesive layer 704 except that major side 710B of adhesive layer 724 is shifted such that major side 710A and major side 710B of FIG. 7B are mirror images of each other.

FIG. 7C is a schematic diagram of one implementation of display system 100 including adhesive layer 734 to couple two adjacent screens together to produce a larger seamless screen according to implementations described herein. The adhesive layer 734 is similar to adhesive layer 704 except that major side 710B of adhesive layer 724 is shifted such that the amplitude 740 of major side 710A is offset relative to and the amplitude 750 of major side 710B of FIG. 7B.

Figure 8:
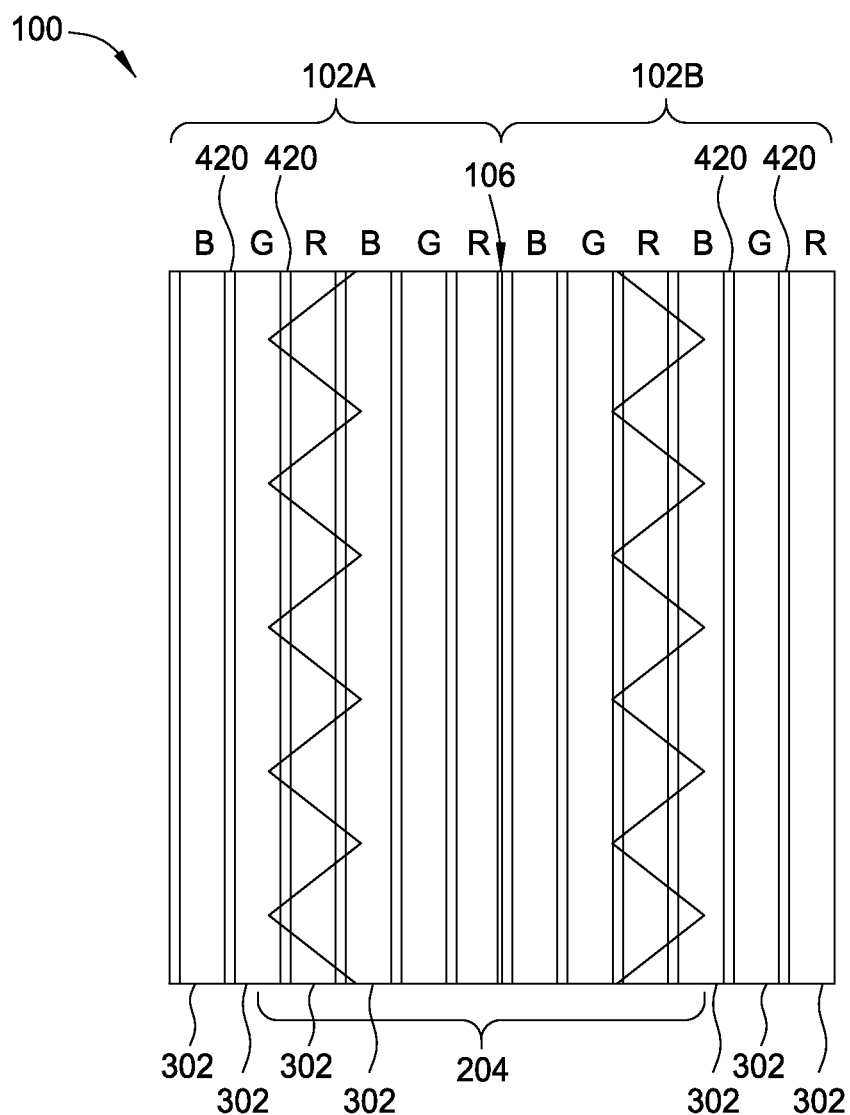
FIG. 8 is a schematic diagram of another implementation of the display system of FIG. 2 including an adhesive layer to couple two adjacent screens together to produce a large seamless screen according to implementations described herein.

FIG. 8 is a schematic diagram of another implementation of the display system of FIG. 2 including adhesive layer 204 to couple two adjacent display screens 102A, 102B together to produce a large seamless screen according to implementations described herein. As depicted in FIG. 8 the at least one major edge of adhesive layer 204 overlaps the phosphor stripes 302.

In some implementations, a method for displaying images on a screen is provided. The method may comprise providing a display screen for displaying the image, producing an optical beam of light to carry image data for an image to be displayed on the screen and directing the optical beam of light onto the screen to produce a segment of light on the screen, wherein the segment of light has at least a major axis and any two points of intersection of a perimeter of the segment of light with the at least one major edge forms a line segment which is less than the length of the major axis. The display screen may comprise a plurality of adjacent sheets with seams formed therebetween, wherein the plurality of sheets are coupled together to form the display screen and a transparent adhesive layer that runs along at least one seam coupling the adjacent sheets as described herein. The transparent adhesive layer may comprise a pair of opposing major edges, wherein at least one major edge of the transparent adhesive layer forms an oblique angle relative to a nearest distance of the at least one major edge to the seam so as not to be parallel to the seam, wherein the at least one major edge may overlap with a light emanating imaging portion of the display screen.

In another implementation, a method for manufacturing a display screen for displaying an image is provided. The method comprises coupling adjacent sheets together by applying a transparent adhesive layer along at least one seam formed between the adjacent sheets. The transparent adhesive layer has a pair of opposing major edges, wherein at least one major edge of the transparent adhesive layer forms an oblique angle relative to its nearest distance to the seam so as not to be parallel to the seam, wherein the at least one major edge may overlap with a light emanating imaging portion of the display screen.

FIG. 9A is a schematic diagram of one implementation of display system 900 using adhesive layer 904 to couple two adjacent screens together to produce a large seamless screen according to implementations described herein. Display system 900 is similar to display system 100 except that the gap or seam 906 mimics a sinusoidal wave pattern rather than the straight seam 106 of display system 100. The gap or seam 906 is formed between the abutting edges of the display screens 102A, 102B.

The positioning of the adhesive layer 904 relative to the phosphor stripes 302 and seam 906 is also depicted. The adhesive layer 904 has two opposing major edges 910A, 910B which are positioned on opposite sides of the seam 906 and two parallel minor edges 912A, 912B which are positioned generally perpendicular to the seam 906. Similar to the major edges 210A, 210B of adhesive layer 204, the major edges 910A, 910B of adhesive layer 904 are "non-straight" or oblique so as to minimize the total surface area of the major edge of the adhesive layer that falls within the beam spot produced by the scanning beam. However, the major edges 910A, 910B of adhesive layer 904 are designed to mimic a sinusoidal wave pattern rather than the triangular pattern of adhesive layer 204. The sinusoidal wave pattern of major edge 910A is aligned with the sinusoidal wave pattern of major edge 910B such that the amplitude 940 of major edge 910A is aligned with the amplitude 950 of major edge 910B. In some implementations, the amplitude 960 of the seam 906 is aligned with the amplitude 940 of at least one of major edge 910A and the amplitude 950 of major edge 910B. In some implementations, the amplitude 960 of the seam 906 is offset relative to the amplitude 940 of at least one of major edge 910A and the amplitude 950 of major edge 910B.

The adhesive layer 904 is transparent. As previously discussed, the side of the adhesive layer 904 contacting the display screens has an adhesive fastener disposed thereon and operable to couple the two display screens 102A, 102B together.

FIG. 9B is a schematic diagram of one implementation of display system 900 including adhesive layer 924 to couple two adjacent screens together to produce a larger seamless screen according to implementations described herein. The adhesive layer 924 is similar to adhesive layer 904 except that major side 910B of adhesive layer 924 is shifted such that major side 910A and major side 910B of FIG. 9B are mirror images of each other. In some implementations, the amplitude 960 of the seam 906 is aligned with either the amplitude 940 of major edge 910A or the amplitude 950 of major edge 910B. In some implementations, as depicted in FIG. 9B, the amplitude 960 of the seam 906 is offset relative to both the amplitude 940 of major edge 910A and the amplitude 950 of major edge 910B.

Figure 9C:
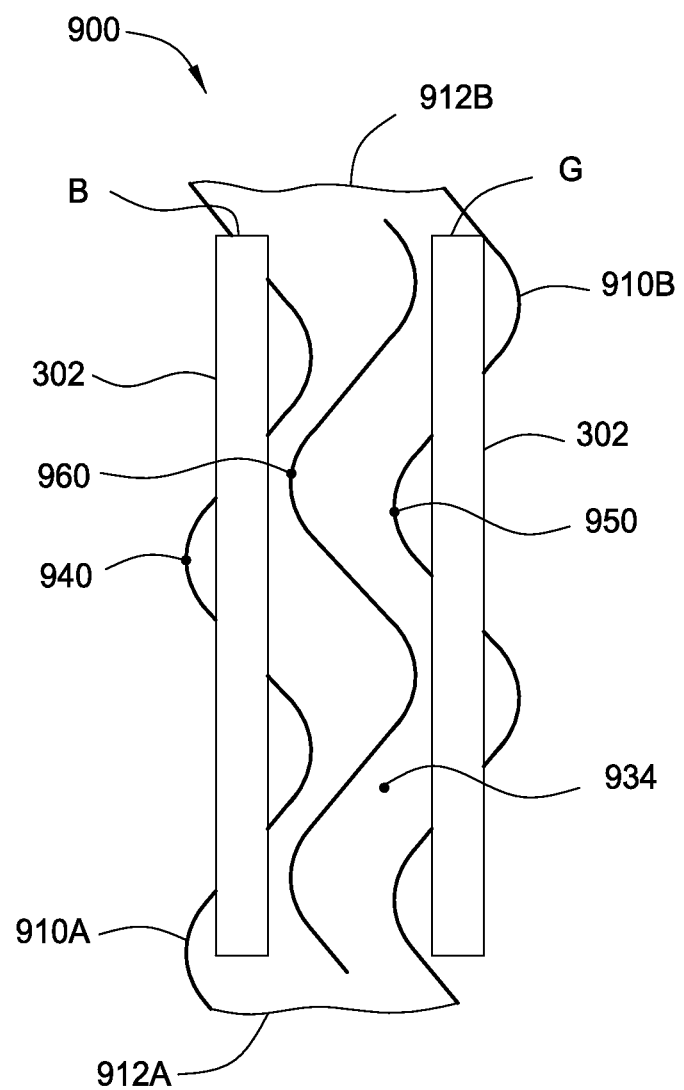

FIG. 9C is a schematic diagram of one implementation of display system 900 including adhesive layer 934 to couple two adjacent screens together to produce a large seamless screen according to implementations described herein. The adhesive layer 934 is similar to adhesive layer 904 and adhesive layer 924 except that major side 910B of adhesive layer 924 is shifted such that the amplitude 940 of major side 910A is slightly offset relative to the amplitude 950 of major side 910B of FIG. 9B. In some implementations, the amplitude 960 of the seam 906 is aligned with either the amplitude 940 of major edge 910A or the amplitude 950 of major edge 910B. In some implementations, as depicted in FIG. 9C, the amplitude 960 of the seam 906 is offset relative to both the amplitude 940 of major edge 910A and the amplitude 950 of major edge 910B.

Figure 10:
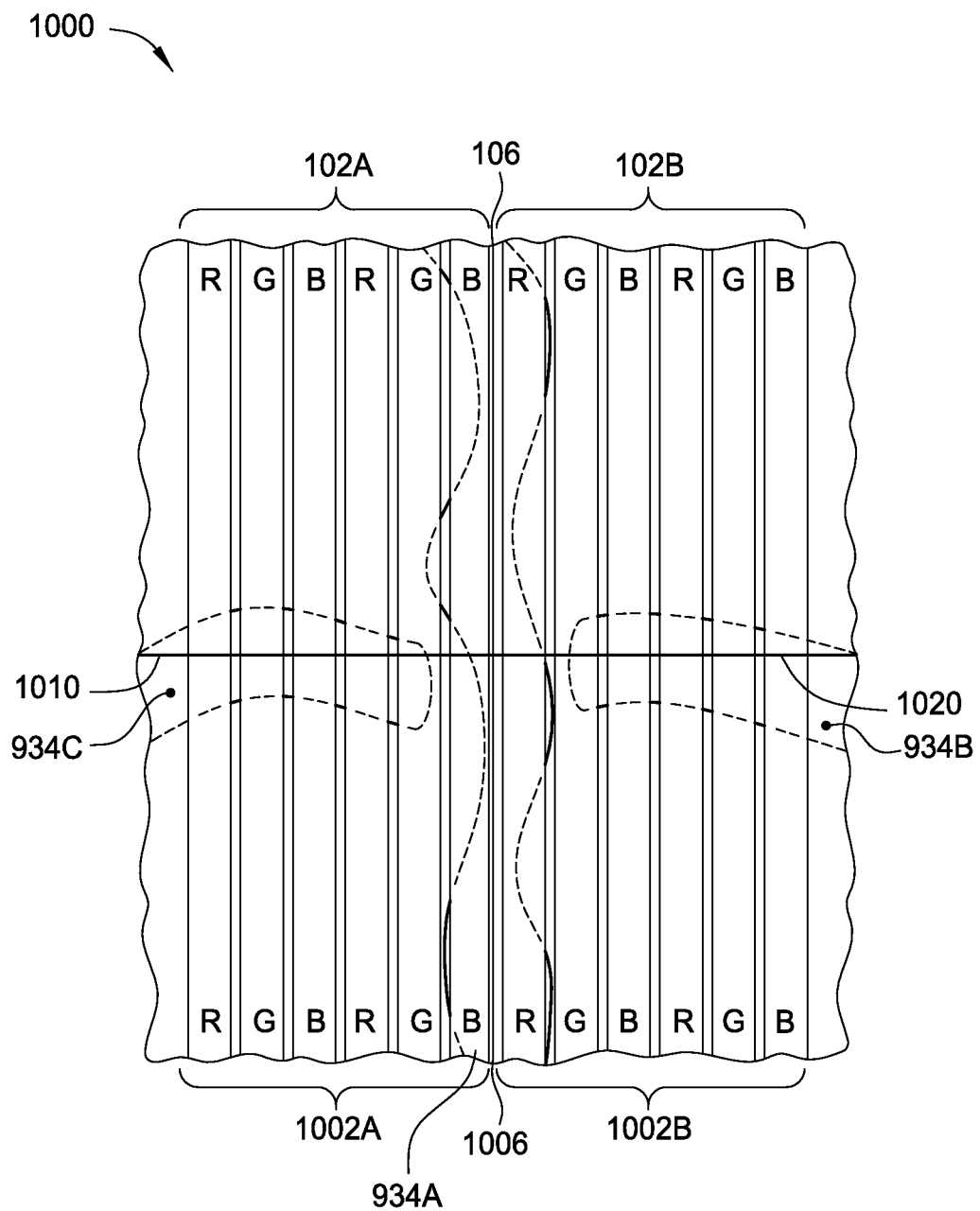
FIG. 10 is a schematic diagram of another implementation of the display system of FIG. 2 including multiple adhesive layers to couple four adjacent screens together to produce a large seamless screen according to implementations described herein.

FIG. 10 is a schematic diagram of another implementation of the display system 1000 of FIG. 2 including multiple adhesive layers 934A, 934B, 934C (collectively 934) to couple four adjacent screens together to produce a large seamless screen according to implementations described herein. FIG. 10 depicts the intersection of the display screens 102A, 102B, 1002A and 1002B. Vertical seam 106 is formed between the abutting edges of the display screens 102A, 102B. Vertical seam 1006 is formed between the abutting edges of the display screens 1002A, 1002B. Horizontal seam 1010 is formed between the abutting edges of the display screens 102A and 1002A. Horizontal seam 1020 is formed between the abutting edges of the display screens 102B and 1002B. It should be understood that although the seams 106, 1006, 1010 and 1020 are depicted as straight seams, other shaped seams (e.g., non-straight seams or angled seams) may be formed between the abutting screens depending upon the design of the edge of each display screen. Adhesive layer 934A is disposed over vertical seams 106 and 1006 to couple the display screens 102A and 102B and display screens 1002A and 1002B together respectively. Adhesive layer 934B is disposed over a portion of horizontal seam 1020 to couple the display screens 102B and 1002B respectively. Adhesive layer 934C is disposed over a portion of horizontal seam 1010 to couple the display screen 102A and 1002A. Although shown As depicted in FIG. 10, the phosphor stripes labeled "R", "G" and "B" of the upper display screens 102A, 102B are aligned with the corresponding phosphor stripes "R", "B" and "G" of the respective lower display screens 1002A, 1002B such that the frequency of the phosphor stripes is continuous across the two display screens. The phosphor stripes of the upper display screens 102A, 102B and the phosphor stripes of the corresponding lower display screens 1002A, 1002B are aligned such that the frequency of the phosphor stripes or (i) subpixels represented by the phosphor stripes or (ii) the spaces between phosphor stripes with space across the stripes itself or (iii) the period of the edge of phosphor stripes appears to be continuous across the vertically adjacent display screens, including across the horizontal seams between the vertically adjacent display screens.

Figure 11:
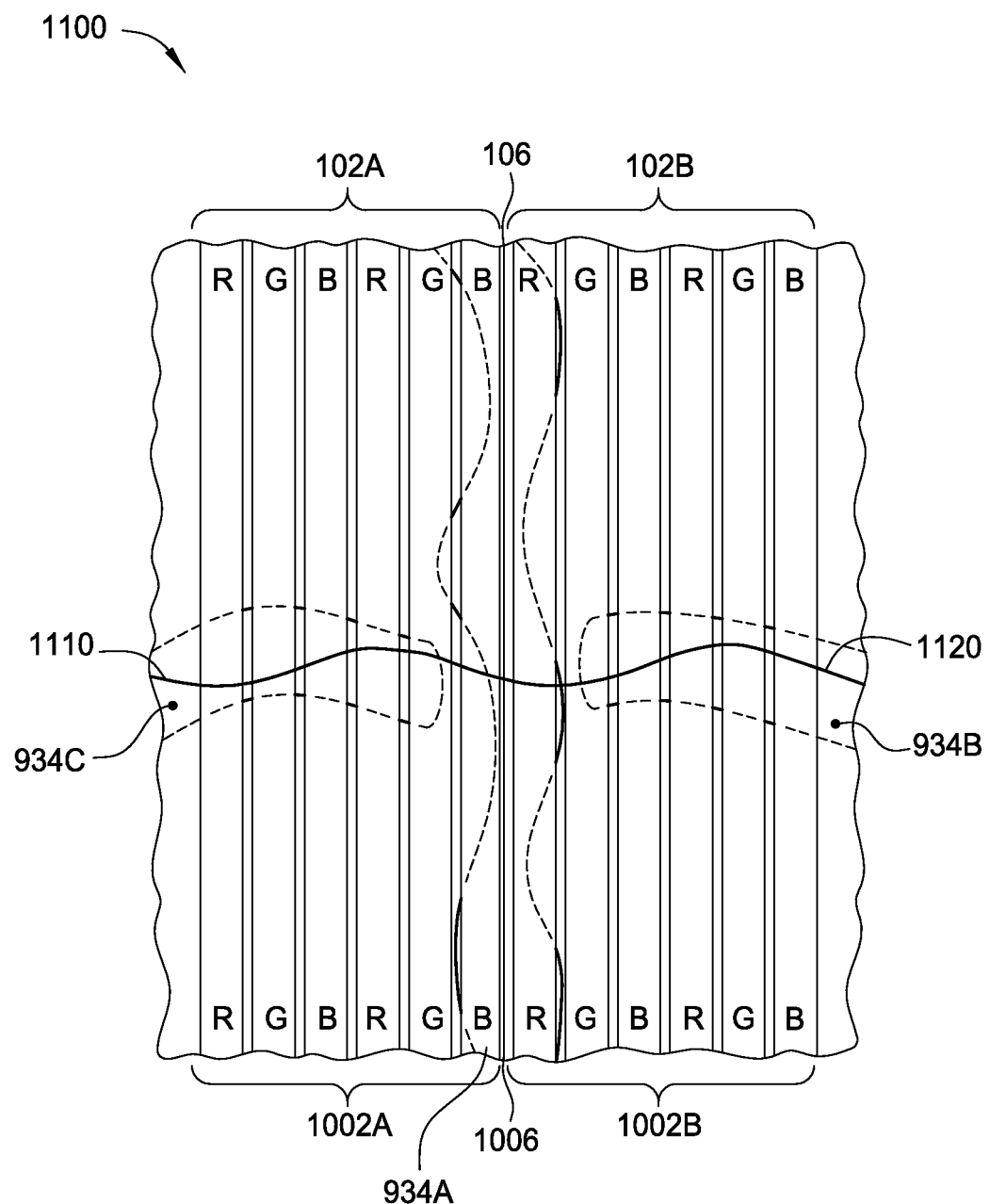
FIG. 11 is a schematic diagram of another implementation of the display system of FIG. 2 including multiple adhesive layers to couple four adjacent screens together to produce a large seamless screen according to implementations described herein.

FIG. 11 is a schematic diagram of another implementation of the display system 1100 of FIG. 2 including multiple adhesive layers to couple four adjacent screens together to produce a large seamless screen according to implementations described herein. The display system 1100 of FIG. 11 is similar to the display system 1000 depicted in FIG. 10 and the display system 100 except that the straight horizontal seams 1010 and 1020 are replaced by non-straight seams 1110 and 1120. Non-straight seam 1110 is formed between the abutting edges of the display screens 102A and 1002A. Non-straight seam 1120 is formed between the abutting edges of the display screens 102B and 1002B. Although non-straight seams 1110 and 1120 are depicted as having sine waveform patterns, non-sinusoidal waveform patterns may also be used. As shown in FIG. 11, the non-straight seam 1120 has an amplitude that is off-set relative to the major edges of the adhesive layer 934C. The non-straight seam 1110 has an amplitude that is off-set relative to the major edges of the adhesive layer 934B.

FIG. 12A is a schematic diagram of another implementation of a display screen 1200 similar to the display screen of FIG. 2 having a vertical seamless panel joint 1210 formed between two adjacent display screens. The display screen 1200 includes a plurality of layers. The plurality of layers are typically several layers comprising various servo layers 1250, phosphor layers and/or standoff layers 1260, and/or filter layers 1270. As depicted in FIG. 12A, the standoff dividers/layers 1260 form a region 1280 around each of the phosphor stripes 302. Implementations of the disclosure contemplate the use of a material having a low-index of refraction that is disposed in the region 1280 between phosphor stripes 302 and the standoff dividers 420 as well as the region between phosphor stripes 302 and the filter layer 1270. The presence of the low-index material in the region 1280, which may be the standoff dividers 420 or any separation between the phosphor regions, minimizes the absorption and/or transmission by the standoff dividers 420 of light emitted by phosphor stripes 302. In another implementation, the region 1280 may also be immediately adjacent the phosphor stripes 302 on the side toward the viewer 306. Alternatively the region 1280 can be air.

It should be understood that the layers depicted in FIG. 12A and FIG. 12B are exemplary and that any layers typically used in the art of display screens may be included in display screen 1200. The seamless panel joint 1210 is formed between a beveled edge 1232 of display screen 1002A and a corresponding beveled edge 1234 of abutting display screen 1002B. The beveled edge 1232 and the beveled edge 1234 may be beveled by conventional means. The beveled edge 1232 and the beveled edge 1234 may be fabricated so as to provide a bevel angle of about 10 degrees to about 85 degrees (e.g., about 40 degrees to 60 degrees). An adhesive layer 1204 couples the two adjacent screens 1002A, 1002B together to produce a large seamless screen according to implementations described herein. Adhesive layer 1204 may be any of the aforementioned adhesive layers.

FIG. 12B is a partial cross-sectional schematic view of a display screen taken along section B-B of FIG. 12A. As depicted in FIG. 12B a horizontal seamless panel joint 1220 is formed between adjacent display screens 102B and 1002B. The horizontal seamless panel joint 1220 is formed between a beveled edge 1242 of display screen 1002B and a corresponding beveled edge 1244 of the abutting display screen 102B. The beveled edge 1242 and the beveled edge 1244 may be beveled by conventional means. The beveled edge 1242 and the beveled edge 1244 may be fabricated so as to provide a bevel angle of about 10 degrees to about 85 degrees (e.g., about 40 degrees to 60 degrees). An adhesive layer 1206 couples the two adjacent display screens 1002B, 102B together to produce a large seamless screen according to implementations described herein. Adhesive layer 1206 may be any of the aforementioned adhesive layers.

Seamless Emission Tile Quilt:

Certain implementations disclosed herein describe a multi-layer tiled screen and a method of forming and using said screen, which can produce one or more simultaneous images. The various layers of the multi-layer screen include one or more edges which, when the screens are abutted to one another, form a continuous large screen with common gap between the layers of the screen. By controlling the position of the edges and corresponding gaps, both in relation to the region of the screen and other gaps, visibility of those gaps to the viewer can be diminished.

Certain implementations described herein include tiling the various sheet layers of the screen (seam) at different locations from each other. In addition, each seam or layer edge should occur in a position on the layer stack between regions of emitting light. This technique not only allows the screen to end up being as large as the number of sheeted layers stitched together, but the seams being between regions of emitting light, which are non-emission regions of the screen hides the seam from the viewer.

The screen tiles are typically several layers comprising various filter layers, phosphor layers and/or standoff layers. These layers being of various thickness and conventionally having a common edge exhibit forms of internal reflections that when the screen edges are brought together, exhibit a luminance and/or color discontinuity. Several approaches are employed to reduce the discontinuity and to effectively make a continuous screen. One key parameter is to reduce the thickness of the layers as edge height which is the layer thickness causes light to change direction to the viewer. One way to accomplish this is by making formerly glass layers, thin plastic layers. Another way is use the dichroic co-extruded filter film on the excitation side of the phosphor layer. A second key parameter involves the staggering of the layers, so the layers do not share a common edge, but one layer extends beyond the layer adjacent layers, so each layer is the only edge in a stack. A third key parameter is to place the staggered edges in non-emission regions to be defined later.

The multi-layer tiled displays can further be configured to produce stereo images, either with a distinct left eye right eye filter layer or other means. Current LPD, systems can provide for high resolution, high brightness and high contrast viewing on extremely large viewing area with a low comparative overall cost of ownership. By adding a polarizing film together with a film patterned retarder to the display screen with (for example) a patterned polarization, the optimal qualities of the LPD or array of displays can be extended to include multiple image viewing, such as viewing of separate images on the screen by different viewers or 3D image production. Implementations of the claimed implementations are more clearly described with reference to the figures below.

Figure 13:
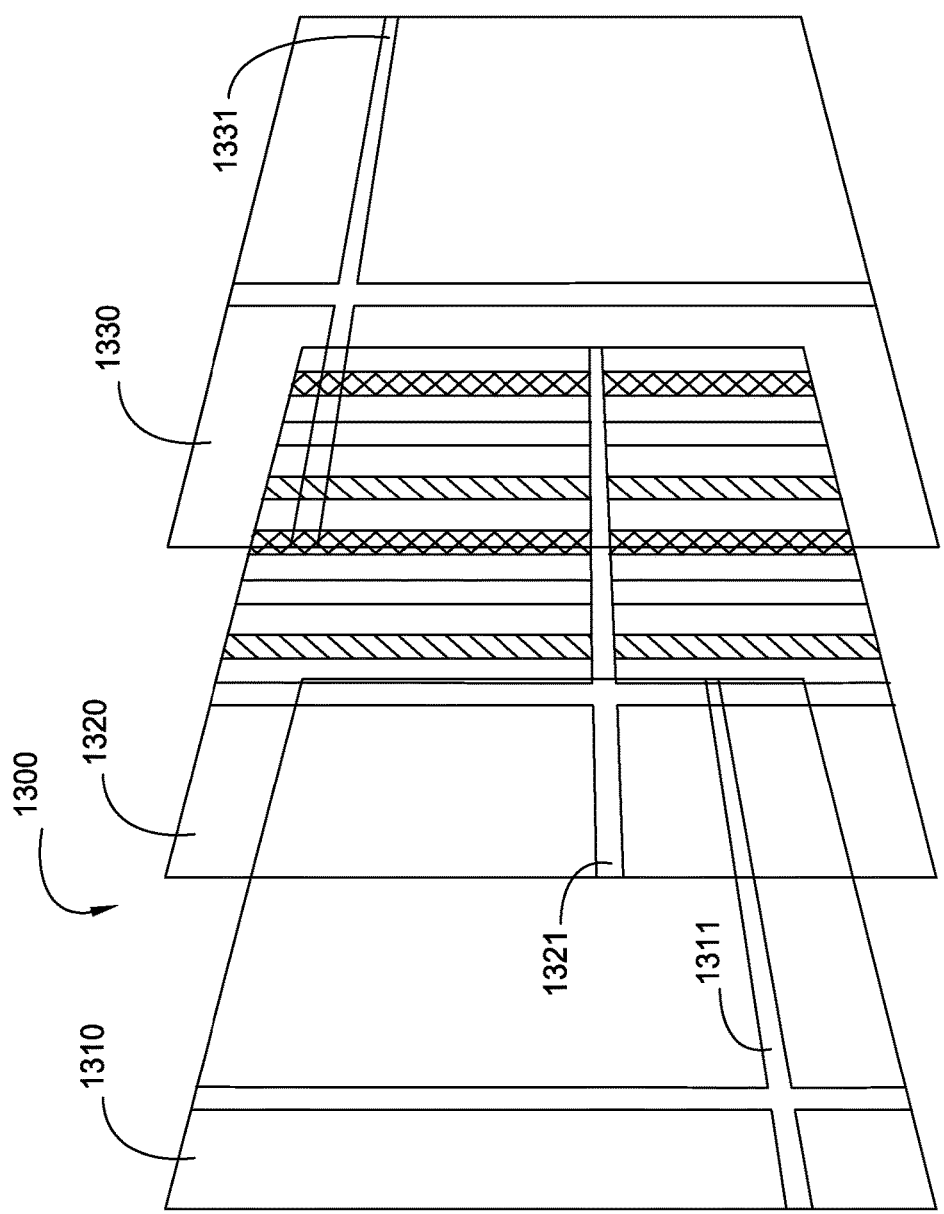
FIG. 13 is a schematic diagram of a multi-layer screen having a vertical and horizontal gap sheet alignment according to implementations described herein.

FIG. 13 is a schematic diagram of a multi-layer screen 1300 having a vertical and horizontal gap sheet alignment according to implementations described herein. In the vertical sheet alignment situation, there can be vertical strips of phosphor and vertical non-emission regions, such as strips of standoff dividers. The goal here is to insure that the gaps between placed layers within the screen vertically positioned to each other are placed in a manner to not occur in line with the phosphor regions. In a similar manner to the horizontally placed abutting layer films, the gaps between abutted layer films for the vertically placed layer films can be in the same location as the above or below layer film gaps. As depicted here, there are three layers: a servo layer 1310; a phosphor layer 1320; and a filter layer 1330. Each of the three layers has abutting layers extending the overall dimension of the composite sheet of the three layers.

In one implementation, the multi-layer screen 1300 includes a plurality of servo layers 1310 with a servo layer gap 1311, where the abutting two servo layers 1310 abut each other. The location of the servo layer gap 1311 is in line with the scan of the laser beam across the screen 1300, such that the servo layer gap 1311 is approximately centered along the scan of the beam. The next layer in the sheet layer stack is the phosphor layer 1320 including a phosphor layer gap 1321. Again here the phosphor layer gap, where the abutting two phosphor layers 1320 abut each other, is located in a second position, distinct from overlapping with the position of the servo layer gap 1311. This phosphor layer gap 1321 is located again in line with a scan of the laser beam as the laser beam scans across the composite sheet, but distinct from the servo layer gap 1311 position and hence distinct from the first laser beam scan position. The subsequent layer in the sheet layer stack is the filter layer 1330 including a filter layer gap 1331. Again here the filter layer gap 1331, where the abutting two filter layers 1331 abut each other, is located in a third position, distinct from the overlapping with the position of the servo layer gap 1311 and the phosphor layer gap 1321. This filter layer gap 1331 is located again in line of a scan of the laser beam as the laser beam scans across the composite sheet, but distinct from the servo layer gap 1311 position and hence distinct from the first laser beam scan position as well as distinct from the phosphor layer gap 1321 position and hence distinct from the second laser beam scan position.

Of course, there may be more layers that are to be abutted to each other either in different layers or to make the screen even larger in the vertical or horizontal. Each of any additional layers will have staggered gaps, so as to minimize overlapping gaps in the layer stack.

Also there is the possibility that the overall screen may need to be both vertically and horizontally enlarged, thereby including the staggering of the layers in both the horizontal and vertical. This staggering can allow a fully extensible sized screen with minimal overlap of the layers in the stack minimizing the apparent visual identification of the gaps in the screen.

In one implementation, a system can include a light generator; a multi-layer screen which permits light from the light generator to propagate through at least one or more layers of the multi-layer screen where at least one layer is scanned by a nearly fixed aperture sized beam of light along a first scan line; and a first layer within the multi-layer screen, where the first layer is two films abutted against each other, the abutment includes a first film layer gap between the two films where the first film layer gap between the two films is coincident with the first scan line. The coincidence between the first film layer gap and the first scan line can have the gap exclusively in proximity to the scanned light aperture of the scan line. The proximity can be based on a stacked manner. At least one layer can be scanned by a nearly fixed aperture sized beam of light along a second scan line, where the second scan line is distinct from the first scan line, where the multi-layer screen further comprises a second layer within the multi-layer sheet, and where the second layer is two films abutted. The coincidence between the second film layer gap and the second scan line can have the gap exclusively in proximity to the scanned light aperture of the second scan line. A layer within the multi-layer screen can have at least one phosphor region.

In another implementation, a system can include a light generator configured to produce light, a multi-layer screen configured to permit light from the light generator to propagate through at least one or more layers of the multi-layer screen where at least one layer is scanned by a nearly fixed aperture sized beam of light along a first scan line and a first layer plane within the multi-layer screen, the first layer plane comprising two layers, wherein the edge of each of two layers within the plane abut against each other creating a first layer plane gap between the two layers, and wherein the first layer plane gap between the two films is coincident with the first scan line. In a further implementation, the light generator can be further configured to render image information in producing the scan line in line with the second gap. In a further implementation, the light generator is further configured to render image information in producing the scan line not in line with the second gap.

In sum, implementations of the present disclosure set forth a multi-layer display device that is capable of being tiled without showing a visible edge between the screens. The multi-layer tiled screens are then capable of forming single or stereo images. The stereo images can be used for the production of 3D imaging for a single viewer or two images viewed separately by different viewers. It is understood that the two image design could be expanded to more than two viewers, such as by increasing the frame rate and including multiple polarizations of the screen such that more than two images can be accommodated. Advantages of the present disclosure include viewing 3D content in a large screen format and a better viewing experience for the viewer.

While the foregoing is directed to implementations of the present disclosure, other and further implementations of the disclosure may be devised without departing from the basic scope thereof, and the scope thereof is determined by the claims that follow.

The invention claimed is:

1. A system comprising:
    a light generator configured to produce segments of light contributing to forming an image; and
    a display screen
        wherein the image is perceived on the display screen side opposite the light generator,
        wherein the display screen propagates light corresponding to the segments of light contributing to forming an image, the display screen comprising:
        a plurality of adjacent sheets with seams formed therebetween, wherein the plurality of adjacent sheets are coupled together to form the display screen; and
        a transparent adhesive layer that runs along at least one seam and extending beyond either side of the seam, coupling the adjacent sheets together, the transparent adhesive layer comprising:
            a pair of opposing major edges, wherein at least one major edge of the transparent adhesive layer forms an oblique angle relative to a nearest distance of the at least one seam so as not to be parallel to the seam, wherein the at least one major edge may overlap with a light emanating imaging portion of the display screen wherein at least one of at least one edge forms at least one angle relative to its nearest distance to at least one of one or more phosphor stripes positioned on the display screen wherein the at least one major edge of the transparent adhesive layer forms at least a second angle different than the oblique angle at a second location along the edge.

2. The system of claim 1, wherein the at least one major edge of the transparent adhesive layer is defined by a sine waveform pattern or a non-sinusoidal waveform pattern.

3. The system of claim 2, wherein the non-sinusoidal waveform pattern is selected from the group consisting of: triangle waveform patterns, saw tooth waveform patterns and square waveform patterns.

4. A system comprising:
    a light generator configured to produce segments of light contributing to forming an image; and
    a display screen
        wherein the image is perceived on the display screen side opposite the light generator,
        wherein the display screen propagates light corresponding to the segments of light contributing to forming an image, the display screen comprising:
        a plurality of adjacent sheets with seams formed therebetween, wherein the plurality of adjacent sheets are coupled together to form the display screen; and
        a transparent adhesive layer that runs along at least one seam coupling the adjacent sheets together, the transparent adhesive layer comprising:
            a pair of opposing major edges, wherein at least one major edge of the transparent adhesive layer forms an oblique angle relative to a nearest distance of the at least one major edge to the at least one seam so as not to be parallel to the seam, wherein the at least one major edge may overlap with a light emanating imaging portion of the display screen wherein the at least one major edge of the transparent adhesive layer is defined by a sine waveform pattern or a non-sinusoidal waveform pattern wherein the at least one major edge of the transparent adhesive layer is defined by a sine wave form pattern and the at least one seam is defined by a sine wave pattern.

5. The system of claim 4, wherein the at least one seam forms an oblique angle relative to its nearest distance to at least one of the one or more phosphor stripes positioned on the display screen.

6. The system of claim 1, wherein the segment of light has at least a major axis and any two points of intersection of a perimeter of the segment of light with the at least one major edge forms a line segment which is less than the length of the major axis.

7. The system of claim 1, further comprising:
    one or more phosphor stripes configured to receive light from the light generator and produce one or more wavelengths of light in response to the light received; and
    one or more separator segments positioned between and in parallel with the phosphor stripes, the separator segments configured to separate the one or more phosphors stripes from one another.

8. The system of claim 7, wherein the at least one seam forms an oblique angle relative to its nearest distance to at least one of the one or more phosphor stripes.

9. The system of claim 8, wherein the at least one major edge of the transparent adhesive layer overlaps at least one of the one or more phosphor stripes.

10. The system of claim 8, wherein the at least one major edge of the transparent adhesive layer overlaps at least one pixel location on at least one of the adjacent sheets.

11. The system of claim 8, wherein the at least one major edge of the transparent adhesive layer overlaps at least one of the one or more separator segments positioned between and in parallel with the one or more phosphor stripes.

12. A method for displaying images on a screen, comprising:
providing a display screen for displaying the image, comprising:
a plurality of adjacent sheets with seams formed therebetween, wherein the plurality of sheets are coupled together to form the display screen; and
a transparent adhesive layer that runs along at least one seam coupling the adjacent sheets and extending beyond either side of the seam, the transparent adhesive layer comprising:
a pair of opposing major edges, wherein at least one major edge of the transparent adhesive layer forms an oblique angle relative to a nearest distance of the at least one major edge to the seam so as not to be parallel to the seam, wherein the at least one major edge may overlap with a light emanating imaging portion of the display screen wherein at least one of at least one edge forms at least one angle relative to its nearest distance to at least one of one or more phosphor stripes positioned on the display screen wherein the at least one major edge of the transparent adhesive layer forms at least a second angle different than the oblique angle at a second location along the edge;
producing an optical beam of light to carry image data for an image to be displayed on the screen;
directing the optical beam of light onto the screen to produce a segment of light on the screen, wherein the segment of light has at least a major axis and any two points of intersection of a perimeter of the segment of light with the at least one major edge forms a line segment which is less than the length of the major axis.

13. The method of claim 12, wherein the display screen further comprises:
one or more phosphor stripes configured to receive light from the light generator and produce one or more wavelengths of light in response to the light received; and
one or more separator segments positioned between and in parallel with the phosphor stripes, the separator segments configured to separate the phosphor stripes from one another.

14. The method of claim 12, wherein the at least one major edge of the transparent adhesive layer is defined by a sine waveform pattern or a non-sinusoidal waveform pattern.

15. The method of claim 13, wherein the at least one seam forms an oblique angle relative to its nearest distance to at least one of the one or more phosphor stripes.

* * * * *